US009230695B2

(12) United States Patent
Ahlfeld et al.

(10) Patent No.: US 9,230,695 B2
(45) Date of Patent: Jan. 5, 2016

(54) NUCLEAR FISSION IGNITER

(75) Inventors: Charles E. Ahlfeld, LaJolla, CA (US);
John Rogers Gilleland, Kirkland, WA (US); Roderick A. Hyde, Redmond, WA (US); Muriel Y. Ishikawa, Livermore, CA (US); David G. McAlees, Bellevue, WA (US); Nathan P. Myhrvold, Medina, WA (US); Charles Whitmer, North Bend, WA (US); Lowell L. Wood, Jr., Bellevue, WA (US)

(73) Assignee: TerraPower, LLC, Bellevue, WA (US)

( * ) Notice: Subject to any disclaimer, the term of this patent is extended or adjusted under 35 U.S.C. 154(b) by 2569 days.

(21) Appl. No.: 12/069,908

(22) Filed: Feb. 12, 2008

(65) Prior Publication Data

US 2008/0240333 A1     Oct. 2, 2008

Related U.S. Application Data

(63) Continuation-in-part of application No. 11/605,943, filed on Nov. 28, 2006, now abandoned, and a continuation-in-part of application No. 11/605,848, filed on Nov. 28, 2006, now Pat. No. 7,860,207, and a continuation-in-part of application No. 11/605,933, filed on Nov. 28, 2006, now abandoned.

(51) Int. Cl.
*G21G 1/06* (2006.01)
*G21C 1/00* (2006.01)
*G21C 1/02* (2006.01)
(Continued)

(52) U.S. Cl.
CPC *G21C 1/00* (2013.01); *G21C 1/026* (2013.01);
*G21C 7/34* (2013.01); *G21D 1/00* (2013.01);
*G21G 4/02* (2013.01); *Y02E 30/34* (2013.01);
*Y02E 30/39* (2013.01)

(58) Field of Classification Search
USPC .......................................... 376/114, 172, 173
See application file for complete search history.

(56) References Cited

U.S. PATENT DOCUMENTS 3,096,263 A     7/1963   Kingston et al.
3,147,191 A     9/1964   Crowther
(Continued)

FOREIGN PATENT DOCUMENTS

DE          1539689        1/1970
DE          2142744        3/1973
(Continued)

OTHER PUBLICATIONS

Wood, Lowell et al.; "Novel Approaches to Nuclear Fission Power Generation: A Practical, *Manisfetly* Safe Point-Design for World-Wide Civil Use in the 21$^{st}$ Century"; Discussion at LLNL P&AT/CGSR ad hoc session; Apr. 25, 2001; 15 pages.
(Continued)

*Primary Examiner* — Jack W Keith
*Assistant Examiner* — Marshall O'Connor

(57) ABSTRACT

Illustrative embodiments provide nuclear fission igniters for nuclear fission reactors and methods for their operation. Illustrative embodiments and aspects include, without limitation, a nuclear fission igniter configured to ignite a nuclear fission deflagration wave in nuclear fission fuel material, a nuclear fission deflagration wave reactor with a nuclear fission igniter, a method of igniting a nuclear fission deflagration wave, and the like.

26 Claims, 37 Drawing Sheets

(51) Int. Cl.
*G21C 7/34* (2006.01)
*G21D 1/00* (2006.01)
*G21G 4/02* (2006.01)

(56) References Cited

U.S. PATENT DOCUMENTS

| | | | |
|---|---|---|---|
| 3,437,847 | A | 4/1969 | Raspet |
| 3,535,562 | A | 10/1970 | Byrd |
| 3,601,638 | A | 8/1971 | Busse |
| 3,607,631 | A | 9/1971 | Hobson et al. |
| 3,629,063 | A | 12/1971 | Houston |
| 3,668,070 | A | 6/1972 | Fiebelmann et al. |
| 3,732,427 | A | 5/1973 | Trudeau et al. |
| 3,854,524 | A | 12/1974 | Gregorie et al. |
| 3,960,655 | A | 6/1976 | Bohanan et al. |
| 4,072,559 | A | 2/1978 | Neidl et al. |
| 4,113,563 | A | 9/1978 | Tobin |
| 4,270,938 | A | 6/1981 | Schmidt et al. |
| T101,204 | I4 | 11/1981 | Hampel |
| 4,303,474 | A | 12/1981 | Baxi |
| 4,478,784 | A | 10/1984 | Burelbach |
| 4,508,677 | A | 4/1985 | Craig et al. |
| 4,591,479 | A | 5/1986 | Weitzberg |
| 4,604,785 | A | 8/1986 | Eddens |
| 4,617,170 | A | 10/1986 | Suchy |
| 4,636,352 | A | 1/1987 | Boyle |
| 4,749,544 | A | 6/1988 | Crowther et al. |
| 4,764,339 | A | 8/1988 | Lake et al. |
| 4,827,139 | A | 5/1989 | Wells et al. |
| 4,851,183 | A | 7/1989 | Hampel |
| 5,019,322 | A | 5/1991 | von Charzewski et al. |
| 5,039,475 | A | 8/1991 | Kennel et al. |
| 5,082,617 | A | 1/1992 | Walter et al. |
| 5,182,077 | A | 1/1993 | Feinroth |
| 5,202,084 | A | 4/1993 | Fennern et al. |
| 5,223,210 | A | 6/1993 | Hunsbedt et al. |
| 5,241,573 | A | 8/1993 | Thacker |
| 5,264,056 | A | 11/1993 | Lapides |
| 5,307,387 | A | 4/1994 | Nakajima et al. |
| 5,309,493 | A | 5/1994 | Kamimura et al. |
| 5,353,321 | A | 10/1994 | Rybnikov |
| 5,408,510 | A | 4/1995 | Ball et al. |
| 5,420,897 | A | 5/1995 | Kasai et al. |
| 5,493,592 | A | 2/1996 | Garzarolli et al. |
| 5,684,848 | A | 11/1997 | Gou et al. |
| 5,774,514 | A | 6/1998 | Rubbia |
| 6,120,706 | A | 9/2000 | Lessing et al. |
| 6,233,298 | B1 | 5/2001 | Bowman |
| 6,512,805 | B1 | 1/2003 | Takeda et al. |
| 6,768,781 | B1 | 7/2004 | Moriarty |
| 6,878,952 | B1 | 4/2005 | Ohsono et al. |
| 6,944,255 | B2 | 9/2005 | Hattori et al. |
| 2003/0174802 | A1 | 9/2003 | Hare |
| 2004/0047445 | A1 | 3/2004 | Delafoy et al. |
| 2004/0182088 | A1 | 9/2004 | Ghoshal et al. |
| 2005/0069075 | A1 | 3/2005 | D'Auvergne |
| 2006/0056572 | A1 | 3/2006 | Lecomte |
| 2006/0109944 | A1 | 5/2006 | Popa |
| 2006/0133972 | A1 | 6/2006 | Guetlhuber et al. |
| 2006/0171498 | A1 | 8/2006 | D'Auvergne |
| 2006/0227924 | A1 | 10/2006 | Hallstadius et al. |
| 2007/0092053 | A1 | 4/2007 | Sato |
| 2008/0069289 | A1 | 3/2008 | Peterson |
| 2008/0123796 | A1 | 5/2008 | Hyde et al. |
| 2008/0232533 | A1 | 9/2008 | Blanovsky |
| 2009/0080587 | A1 | 3/2009 | Ahlfeld et al. |
| 2009/0080588 | A1 | 3/2009 | Ahlfeld et al. |
| 2009/0080592 | A1 | 3/2009 | Arsenlis et al. |

FOREIGN PATENT DOCUMENTS

| | | |
|---|---|---|
| GB | 1063696 | 3/1967 |
| JP | 10-115692 | 5/1998 |
| JP | 2002-071866 A | 3/2002 |
| JP | 2002-181976 A | 6/2002 |
| JP | 2005-527808 A | 9/2005 |
| JP | 2007-232429 | 9/2007 |
| WO | WO 2009/136971 A2 | 11/2009 |
| WO | WO 2009/139899 A1 | 11/2009 |

OTHER PUBLICATIONS

Akhiezer, A. I.; Khizhnyak, N. A.; Shulga, N. F.; Pilipenko, V. V.; and Davydov, L. N.; "Slow Nuclear Burning"; Problems of Atomic Science and Technology; 2001; pp. 272-275; vol. 6.

Atefi, B.; Driscoll, M. J.; and Lanning, D. D.; "An Evaluation of the Breed/Burn Fast Reactor Concept"; Massachusetts Institute of Technology, Department of Nuclear Engineering; Dec. 1979; pp. 1-295.

Feinberg, S. M.; "Discussion Comment"; Rec. of Proc. Session B-10 of the ICPUAE; Sep. 10, 1958; p. 447-449; No. 2, vol. 9; Geneva, Switzerland.

Feoktistov, L. P.; "An Analysis of a Concept of a Physically Safe Reactor"; Preprint IAE-4605/4; Moscow: IAE; 1988; pp. 1-9; in Russian.

Feoktistov, L. P.; "Neutron-Fissioning Wave"; Dokl. Akad. Nauk SSSR; 1989; pp. 864-867; in Russian.

Fomin, S. P.; Mel'Nik, Yu. P.; Pilipenko, V. V.; and Shul'Ga, N. F.; "Study of Self-Organizing Regime of Nuclear Burning Wave in Fast Reactor"; Problems of Atomic Science and Technology; 2005; pp. 106-113, No. 6.

Ohoka, Y.; and Sekimoto, H.; "Application of Candle Burnup to Block-Type High Temperature Gas Cooled Reactor"; Nuclear Engineering and Design; 2004; pp. 15-23; vol. 229; Elsevier B. V.

Sekimoto, Hiroshi; "Application of Candle Burnup Strategy for Future Nuclear Energy Utilization"; Progress in Nuclear Energy; 2005; pp. 91-98; vol. 47; No. 1-4; Elsevier Ltd.; Great Britain.

Sekimoto, Hiroshi; "Fuel-Cycle of Candle Burnup with Depleted Uranium"; Proc. of ICAPP 2005; May 15-19, 2005; Seoul, Korea.

Sekimoto, Hiroshi; "Fuel-Cycle of Candle Burnup with Depleted Uranium"; Proc. of ICAPP 2006; Jun. 4-8, 2006, Reno, Nevada; pp. 1908-1914; American Nuclear Society; LaGrange Park, IL.

European Search Report; International App. No. 07872643; Jun. 6, 2011; pp. 1-13.

Ohoka, Yasunori; Watanabe, Takashi; and Sekimoto, Hiroshi; "Simulation Study on Candle Burnup Applied to Block-Type High Temperature Gas Cooled Reactor"; Progress in Nuclear Energy; 2005; pp. 292-299; vol. 47, No. 1-4; Elsevier, Ltd.; Great Britain.

European Patent Office, Summons to attend oral proceedings pursuant to Rule 115(1) EPC; App. No. 07872643.7; Feb. 21, 2013 (received by our Agent on Feb. 25, 2013); pp. 1-4.

PCT International Search Report; International App. No. PCT/US2009/04512; Dec. 7, 2009; pp. 1-2.

Chen et al.; "Transverse buckling effects on solitary burn-up waves"; Annals of Nuclear Energy; bearing dates of Dec. 24, 2004, Jan. 5, 2005, and Apr. 29, 2005; pp. 1377-1390; vol. 32; Elsevier Ltd.

St. Clair, Richard; Summary of MIT-Tokyo Tech Symposium on Innovative Nuclear Energy Systems; Nov. 2-4, 2005; pp. 1-17; MIT Department of Nuclear Science and Engineering; Cambridge, MA.

PCT International Search Report; International App. No. PCT/US09/03028; Jul. 7, 2009; pp. 1-2.

European Patent Office; European Search Report; Application No. EP 09 80 6943; Dec. 21, 2012; pp. 1-3.

European Patent Office; European Search Report; Application No. EP 07 87 3851; Dec. 21, 2012; pp. 1-4.

International Search Report; International App. No. PCT/US2009/00765; Oct. 13, 2009; pp. 1-2.

International Search Report; International App. No. PCT/US2009/00764; Oct. 13, 2009; pp. 1-2.

International Search Report; International App. No. PCT/US2009/00763; Oct. 5, 2009; pp. 1-2.

Teller, Edward. "Nuclear Energy for the Third Millenium"; International Conference on Environment and Nuclear Energy Oct. 27-29, 1997; bearing a date of Oct. 1997; 1-14; Livermore, California.

European Search Report; App. No. 09742958.3; Mar. 29, 2011; p. 1-4.

Sekimoto, Hiroshi, Miyashita, Seiichi; "Startup of 'Candle' burnup in fast reactor from enriched uranium core"; Energy Conversion and Management; May 22, 2006; p. 2772-2780; vol. 47; Elsevier Ltd.

(56) References Cited

OTHER PUBLICATIONS

Chinese Patent Office; Second Office Action; Patent App. No. 200780049972.8; Dec. 31, 2012; pp. 1-6 (no translation provided).
Chinese Patent Office; Office Action; Patent App. No. 200780049941.2; Dec. 28, 2012; pp. 1-8 (no translation provided).
Chinese Patent Office; Second Office Action; Patent App. No. 200780049881.4; Dec. 28, 2012; pp. 1-4 (no translation provided).
Japanese Patent Office; Office Action; Patent App. No. 2009-539290; Jan. 8, 2013; pp. 1-6 (no translation provided).
Japanese Patent Office; Office Action; Patent App. No. 2009-539275; Jan. 8, 2013; pp. 1-7 (no translation provided).
Japanese Patent Office; Office Action; Patent App. No. 2009-539277; Jan. 8, 2013; pp. 1-4 (no translation provided).
Wang et al.; "Trial-manufacture of Cladding Materials of Core Subassemblies in China Experimental Fast Reactor"; Atomic Energy Science and Technology; Jul. 2003; pp. 73-76; vol. 37, Suppl. (no translation provided).
European Patent Office Search Report; App. No. EP 09 74 6986; Feb. 22, 2012 (received by our agent on Mar. 1, 2012); pp. 1-7.
"Accelerator-driven Systems (ADS) and Fast Reactors (FR) in Advanced Nuclear Fuel Cycles: A Comparative Study"; Nuclear Energy Agency Organisation for Economic Co-Operation and Development; May 2, 2002 (as provided by examiner); pp. 43-46 (6 pages total); OECD Publications, Paris Cedex, France.
Teller et al; "Completely Automated Nuclear Power Reactors for Long-Term Operation: III. Enabling Technology for Large-Scale, Low Risk, Affordable Nuclear Electricity"; Lawrence Livermore National Laboratory; Nov. 30, 2003; pp. 1-59 (61 pages total); Preprint UCRL-JRNL-122708.
"Accelerator-Driven Systems (ADS) and Fast Reactors (FR) in Advanced Nuclear Fuel Cycles, A Comparative Study"; 2002; pp. 43-46; Nuclear Energy Agency Organisation for Economic Co-Operation and Development.
Code of Federal Regulations, 10 CFR Parts 0-50; Jan. 1, 1994; pp. 624 and 724-726; Office of the Federal Register, National Archives and Records Administration.
Hyde et al.; "Nuclear Fission Power for 21$^{st}$ Century Needs: Enabling Technologies for Large-Scale, Low-Risk, Affordable Nuclear Electricity"; Progress in Nuclear Energy; 2007; pp. 82-91; vol. 50; Elsevier Ltd.
Chinese Patent Office; First Office Action; App. No. 2007/80049972.8 (based on PCT Patent Application No. PCT/US07/024375); Feb. 1, 2012 (received by our agent on Feb. 6, 2012); pp. 1-4.
Chinese Patent Office First Office Action (with attachment); App. No. 2007/80049881.4; Dec. 29, 2011; 15 pages (including attachment); no translation available.
Chinese State Intellectual Property Office; Notification of the First Office Action; App. No. 200980112650.2; Jan. 30, 2013 (received by our agent on Feb. 1, 2013); pp. 1-5 (no English Translation Provided).
Chinese Patent Office; First Office Action; App. No. 2007/80049941.2; Jan. 29, 2012 (received by our agent Feb. 2, 2012); pp. 1-6; no translation available.
(Author unknown); "CEFR"; bearing a date of Oct. 1, 1998; pp. 1-1 through 1-8; no translation available.
Emelyanov, I.Y. et al.; "Construction of Nuclear Reactors: Textbook for Schools"; bearing a date of 1982; 2 pages; Energoizdat; Moscow, Russia (machine translation to English provided, 1 page).
Samoilov, A. G. et al.; "Nuclear Reactor Fuel Element"; bearing a date of 1996; 10 pages; Energoatomizdat; Moscow, Russia; (machine translation to English provided, 10 pages).
European Patent Office Search Report; App. No. EP 07 872 643.7; Feb. 3, 2012 (received by our agent on Feb. 7, 2012); pp. 1-3.
European Patent Office; Supplementary European Search Report; App. No. EP 07 87 3828; Jun. 26, 2012 (received by our agent on Jul. 12, 2012); pp. 1-3.
European Patent Office; Communication Pursuant to Article 94(3) EPC; Application No. 09 746 986.0; Jan. 31, 2013; (Received by our agent Feb. 5, 013); pp. 1- 5.
European Office Action; European App. No. EP 09 742 958.3; Nov. 15, 2011; pp. 1-3 (received by our agent on Nov. 21, 2011).
Japanese Patent Office; The First Office Action (Notice of Reason for Refusal); App. No. 2010-546768 (based on PCT Patent Application No. PCT/US2009/000763); Jun. 18, 2013; pp. 1-5 (machine translation provided, 8 pages ).
Russian Federal Service for Intellectual Property; Office Action; Russian Application No. 2010147880; Oct. 17, 2012 ; 19 pages; (machine translation to English provided, 12 pages).
Russian Office Action; App. No. 2010136176/07(051427); dated Jul. 9, 2012 (received by our agent on Jul. 24, 2012); pp. 1-8 (3 pages of machine translation).
Emelyanov, I.Y. et al; "Design of Nuclear Reactors"; bearing a date of 1982; pp. 194-196; Energoatomizdat; Moscow (NPL not provided to Applicant and not included with Supplemental IDS).
Sekimoto, Hiroshi and Ryu, Kouichi; "A New Reactor Burnup Concept 'Candle'"; Proc. of PHYSOR2000; May 7-11, 2000; pp. 1-9; Pittsburgh, PA.
Sekimoto, Hiroshi; Ryu, Kouichi; and Yoshimura, Yoshikane; "Candle: The New Burnup Strategy"; Nuclear Science and Engineering; 2001; pp. 306-317; vol. 139.
Sekimoto, Hiroshi and Tanaka, Kohtaro; "Candle Burnup for Different Cores"; Proc. of PHYSOR 2002: International Conference on the New Frontiers of Nuclear Technology: Reactor Physics, Safety and High-Performance Computing; Oct. 7-10, 2002; pp. 1-12; Seoul, Korea.
Sekimoto, Hiroshi; Toshinsky, V.; and Ryu, K.; "Natural Uranium Utilization without Enrichment and Reprocessing"; Proc. of Global 2001; Sep. 9-13, 2001; pp. 1-3; Paris, France.
Soentono, Soedyartomo; "Nuclear Power Development in Indonesia"; Proc. of Energy Future and the Nuclear Fuel Cycle in the Asia/Pacific Region, 19th Annual Conference Industrial Liaison Program; pp. 51-61; Mar. 12, 1997.
Toshinsky, Georgy I.; "LMFBR Operation in the Nuclear Cycle Without Fuel Reprocessing"; Proceedings of the International Topical Meeting on Advanced Reactors Safety (ARS '97); Jun. 1-5, 1997; pp. 39-44; vol. I; Orlando, FL.
Toshinsky, Vladimir G.; Sekimoto, Hiroshi; and Toshinsky, Georgy I.; "Multiobjective Fuel Management Optimization for Self-Fuel-Providing LMFBR Using Genetic Algorithms"; Annals of Nuclear Energy; 1999; pp. 783-802; vol. 26; Elsevier Science Ltd.
Van Dam, Hugo; "The Self-Stabilizing Criticality Wave Reactor"; Proc. of the Tenth International Conference on Emerging Nuclear Energy Systems (ICENES 2000); 2000; pp. 009.1-009.10; Petten, Netherlands.
Yarsky, P.; Driscoll, M. J.; and Hejzlar, P.; "Integrated Design of a Breed and Burn Gas-Cooled Fast Reactor Core"; The MIT Center for Advanced Nuclear Energy Systems (CANES); Document No. MIT-ANP-TR-107; Sep. 2005; pp. 1-253.
Teller, Edward; Ishikawa, Muriel; Wood, Lowell; "Completely Automated Nuclear Reactors for Long-Term Operation"; Frontiers in Physics Symposium, Joint American Physical Society and the America Association of Physics Teachers Texas meeting Oct. 26-28, 1995; Jan. 1996; Lubbock, Texas; pp. 1-15.
Wood, Lowell; Ishikawa, Muriel; Hyde, Roderick; "Global Warming and Nuclear Power"; 9$^{th}$ Summer Workshop, Innovative Energy Systems and CO2 Stabilization Jul. 14-24, 1998, Aspen Global Change Institute; Jul. 10, 1998; Aspen, Colorado; pp. 1-21.
PCT International Search Report; International App. No. PCT/US2007/024392; Oct. 7, 2008; pp. 1-4.
PCT International Search Report; International App. No. PCT/US2007/024445; Aug. 26, 2008; pp. 1-2.
PCT International Search Report; International App. No. PCT/US2007/024375; Oct. 7, 2008; pp. 1-4.
Teller, Edward; Ishikawa, Muriel; Wood, Lowell; "Completely Automated Nuclear Reactors for Long-Term Operation"; "Frontiers in Physics Symposium"; bearing dates of Oct. 26-28, 1995 and Jan. 1996; pp. 1-13; Lawrence Livermore National Laboratory; Livermore, California.
Teller, Edward; Ishikawa, Muriel; Wood, Lowell; Hyde, Roderick; Nuckolls, John; "Completely Automated Nuclear Power Reactors for Long-Term Operation: III. Enabling Technology for Large-Scale,

(56) References Cited

OTHER PUBLICATIONS

Low-Risk, Affordable Nuclear Electricity"; pp. 1-57; University of California Lawrence Livermore National Laboratory; Livermore, California.

Teller, Edward; Ishikawa, Muriel; Wood, Lowell; Hyde, Roderick; Nuckolls, John; "Completely Automated Nuclear Reactors for Long-Term Operation II: Toward a Concept-Level Point-Design of a High-Temperature, Gas-Cooled Central Power Station"; 1996 International Conference on Emerging Nuclear Energy Systems; bearing dates of Jun. 20, 1996 and Jun. 24-28, 1996; pp. 1-44; Lawrence Livermore National Laboratory; Livermore, California.

Teller, Edward; Wood, Lowell; Nuckolls, John; Ishikawa, Muriel; Hyde, Roderick; "Problem-Free Nuclear Power and Global Change"; $22^{nd}$ International Symposium on Planetary Emergencies; bearing dates of Aug. 15, 1997 and Aug. 20-23, 1997; pp. 1-10; Lawrence Livermore National Laboratory; Livermore, California.

Wood, Lowell; Hyde, Rod; Ishikawa, Muriel; "Novel Approaches to Nuclear Fission Power Generation: A Practical, *Manifestly* Safe Point-Design for World-Wide Civil Use in the $21^{st}$ Century"; LLNL P&AT/CGSR ad hoc session; bearing a date of Apr. 25, 2001; pp. 1-15.

Wood, Lowell; Ishikawa, Muriel; Hyde, Roderick; "Global Warming and Nuclear Power"; Ninth Summer Workshop Innovative Energy Systems and CO2 Stabilization Aspen Global Change Institute in Aspen, CO; bearing dates of Jul. 10, 1998 and Jul. 14-24, 1998; pp. 1-22; Lawrence Livermore National Laboratory; Livermore, California.

Xu et al.; "China Experimental Fast Reactor"; China Institute of Atomic Energy, Beijing; bearing a date of 1995; pp. 53-59; China Academic Journal Electronic Publishing House (no translation provided).

U.S. Appl. No. 11/605,848, filed Nov. 28, 2006, Hyde et al.

U.S. Appl. No. 11/605,933, filed Nov. 28, 2006, Hyde et al.

Hyde, Roderick; Ishikawa, Muriel; Myhrvold, Nathan; Nuckolls, John; Wood, Lowell; "Nuclear Fission Power for $21^{st}$ Century Needs: Enabling Technologies for Large-Scale, Low-Risk, Affordable Nuclear Electricity" [Abstract]; pp. 1.

NUCLEAR FISSION IGNITER

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

Related Applications:

For purposes of the USPTO extra-statutory requirements, the present application constitutes a continuation-in-part of U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, AND LOWELL L. WOOD, JR. as inventors, filed 28 Nov. 2006, now abandoned, or is an application of which a currently co-pending application is entitled to the benefit of the filing date.

For purposes of the USPTO extra-statutory requirements, the present application constitutes a continuation-in-part of U.S. patent application Ser. No. 11/605,848, entitled METHOD AND SYSTEM FOR PROVIDING FUEL IN A NUCLEAR REACTOR, naming RODERICK A. HYDE, MURIEL Y. ISHIKAWA, NATHAN P. MYHRVOLD, AND LOWELL L. WOOD, JR. as inventors, filed 28 Nov. 2006, now U.S. Pat. No. 7,860,207, or is an application of which a currently co-pending application is entitled to the benefit of the filing date.

For purposes of the USPTO extra-statutory requirements, the present application constitutes a continuation-in-part of U.S. patent application Ser. No. 11/605,933, entitled CONTROLLABLE LONG TERM OPERATION OF A NUCLEAR REACTOR, naming RODERICK A. HYDE, MURIEL Y. ISHIKAWA, NATHAN P. MYHRVOLD, AND LOWELL L. WOOD, JR. as inventors, filed 28 Nov. 2006, now abandoned, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present application relates to nuclear fission reactors and nuclear fission igniters related thereto.

SUMMARY

The following embodiments and aspects thereof are described and illustrated in conjunction with systems and methods which are meant to be illustrative, not limiting in scope.

Illustrative embodiments provide nuclear fission igniters for nuclear fission reactors and methods for their operation. Illustrative embodiments and aspects include, without limitation, a nuclear fission igniter configured to ignite a nuclear fission deflagration wave in nuclear fission fuel material, a nuclear fission deflagration wave reactor with a nuclear fission igniter, a method of igniting a nuclear fission deflagration wave, and the like.

In addition to the illustrative embodiments and aspects described above, further embodiments and aspects will become apparent by reference to the drawings and by study of the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

DETAILED DESCRIPTION

By way of overview, embodiments provide nuclear fission igniters for nuclear fission reactors and methods for their operation. Illustrative embodiments and aspects include, without limitation, a nuclear fission igniter configured to ignite a nuclear fission deflagration wave in nuclear fission fuel material, a nuclear fission deflagration wave reactor with a nuclear fission igniter, a method of igniting a nuclear fission deflagration wave, and the like. Details of an illustrative reactor, illustrative core nucleonics, and operations, all given by way of non-limiting example, will be set forth first. Such details are included in U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, AND LOWELL L. WOOD, JR. as inventors, filed 28 Nov. 2006, U.S. patent application Ser. No. 11/605,848, entitled METHOD AND SYSTEM FOR PROVIDING FUEL IN A NUCLEAR REACTOR, naming RODERICK A. HYDE, MURIEL Y. ISHIKAWA, NATHAN P. MYHRVOLD, AND LOWELL L. WOOD, JR. as inventors, filed 28 Nov. 2006, and U.S. patent application Ser. No. 11/605,933, entitled CONTROLLABLE LONG TERM OPERATION OF A NUCLEAR REACTOR, naming RODERICK A. HYDE, MURIEL Y. ISHIKAWA, NATHAN P. MYHRVOLD, AND LOWELL L. WOOD, JR. as inventors, filed 28 Nov. 2006, the entire contents of which are hereby incorporated by reference. Then, details will be set forth regarding several illustrative embodiments and aspects.

Figure 1A:
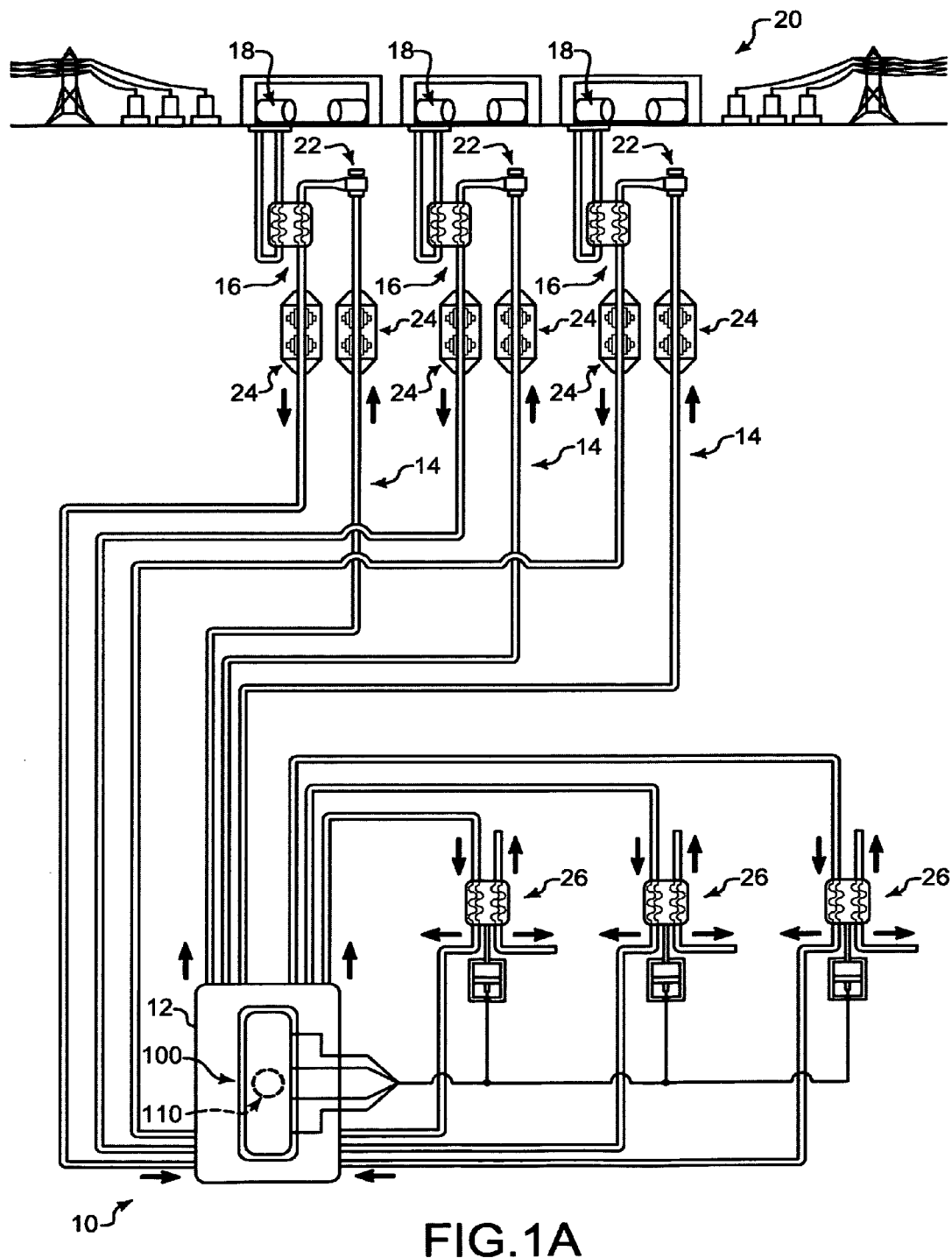
FIG. 1A schematically illustrates an illustrative nuclear fission reactor including an illustrative nuclear fission igniter module.

Referring now to FIG. 1A, a nuclear fission reactor 10, given by way of example and not of limitation, acts as an illustrative host environment for embodiments and aspects described herein. To that end, the reactor 10 includes an illustrative nuclear fission igniter 110. While many embodiments of the reactor 10 are contemplated, a common feature among many contemplated embodiments of the reactor 10 is origination and propagation of a nuclear fission deflagration wave, or "burnfront".

Considerations

Before discussing details of the reactor 10, some considerations behind embodiments of the reactor 10 will be given by way of overview but are not to be interpreted as limitations. Some embodiments of the reactor 10 address many of the considerations discussed below. On the other hand, some other embodiments of the reactor 10 may address one, or a select few, of these considerations, and need not accommodate all of the considerations discussed below. Portions of the following discussion include information excerpted from a paper entitled "Completely Automated Nuclear Power Reactors For Long-Term Operation: III. Enabling Technology For Large-Scale, Low-Risk, Affordable Nuclear Electricity" by Edward Teller, Muriel Ishikawa, Lowell Wood, Roderick Hyde, and John Nuckolls, presented at the July 2003 Workshop of the Aspen Global Change Institute, University of California Lawrence Livermore National Laboratory publication UCRL-JRNL-122708 (2003) (This paper was prepared for submittal to Energy, The International Journal, 30 Nov. 2003. the entire contents of which are hereby incorporated by reference.

Certain of the nuclear fission fuels envisioned for use in embodiments of the reactor 10 are typically widely available, such as without limitation uranium (natural, depleted, or enriched), thorium, plutonium, or even previously-burned nuclear fission fuel assemblies. Other, less widely available nuclear fission fuels, such as without limitation other actinide elements or isotopes thereof may be used in embodiments of the reactor 10. While some embodiments of the reactor 10 contemplate long-term operation at full power on the order of around ⅓ century to around ½ century or longer, an aspect of some embodiments of the reactor 10 does not contemplate nuclear refueling (but instead contemplate burial in-place at end-of-life) while some aspects of embodiments of the reactor 10 contemplate nuclear refueling—with some nuclear refueling occurring during shutdown and some nuclear refueling occurring during operation at power. It is also contemplated that nuclear fission fuel reprocessing may be avoided in some cases, thereby mitigating possibilities for diversion to military uses and other issues.

Other considerations that may affect choices for some embodiments of the reactor 10 may include disposing in a manifestly safe manner long-lived radioactivity generated in the course of operation. It is envisioned that the reactor 10 may be able to mitigate damage due to operator error, casualties such as a loss of coolant accident (LOCA), or the like. In some aspects decommissioning may be effected in low-risk and inexpensive manner.

For example, some embodiments of the reactor 10 may entail underground siting, thereby addressing large, abrupt releases and small, steady-state releases of radioactivity into the biosphere. Some embodiments of the reactor 10 may entail minimizing operator controls, thereby automating those embodiments as much as practicable. In some embodiments, a life-cycle-oriented design is contemplated, wherein those embodiments of the reactor 10 can operate from startup to shutdown at end-of-life. In some life-cycle oriented designs, the embodiments may operate in a substantially fully-automatic manner. Some embodiments of the reactor 10 lend themselves to modularized construction. Finally, some embodiments of the reactor 10 may be designed according to high power density.

Some features of various embodiments of the reactor 10 result from some of the above considerations. For example, simultaneously accommodating desires to achieve ⅓-½ century (or longer) of operations at full power without nuclear refueling and to avoid nuclear fission fuel reprocessing may entail use of a fast neutron spectrum. As another example, in some embodiments a negative temperature coefficient of reactivity ($\alpha_T$) is engineered-in to the reactor 10, such as via negative feedback on local reactivity implemented with strong absorbers of fast neutrons. As a further example, in some embodiments of the reactor 10 a distributed thermostat enables a propagating nuclear fission deflagration wave mode of nuclear fission fuel burn. This mode simultaneously permits a high average burn-up of non-enriched actinide fuels, such as natural uranium or thorium, and use of a comparatively small "nuclear fission igniter" region of moderate isotopic enrichment of nuclear fissionable materials in the core's fuel charge. As another example, in some embodiments of the reactor 10, multiple redundancy is provided in primary and secondary core cooling.

Illustrative Embodiment of Nuclear Fission Reactor

Now that some of the considerations behind some of the embodiments of the reactor 10 have been set forth, further details regarding an illustrative embodiment of the reactor 10 will be explained. It is emphasized that the following description of an illustrative embodiment of the reactor 10 is given by way of non-limiting example only and not by way of limitation. As mentioned above, several embodiments of the reactor 10 are contemplated, as well as further aspects of the reactor 10. After details regarding an illustrative embodiment of the reactor 10 are discussed, other embodiments and aspects will also be discussed.

Still referring to FIG. 1A, an illustrative embodiment of the reactor 10 includes a nuclear fission reactor core assembly 100 that is disposed within a reactor pressure vessel 12. The nuclear fission igniter 110 is removably received in the reactor core assembly 100. Details regarding illustrative examples of the nuclear fission igniter 110 will be explained below. Several embodiments and aspects of the nuclear fission reactor core assembly 100 are contemplated that will be discussed later. Some of the features that will be discussed later in detail regarding the nuclear fission reactor core assembly 100 include nuclear fission fuel materials and their respective nucleonics, fuel assemblies, fuel geometries, and initiation and propagation of nuclear fission deflagration waves.

The reactor pressure vessel 12 suitably is any acceptable pressure vessel known in the art and may be made from any materials acceptable for use in reactor pressure vessels, such as without limitation stainless steel or alloys, e.g., HT-9. Within the reactor pressure vessel 12, a neutron reflector (not shown) and a radiation shield (not shown) surround the nuclear fission reactor core assembly 100. In some embodiments, the reactor pressure vessel 12 is sited underground. In such cases, the reactor pressure vessel 12 can also function as a burial cask for the nuclear fission reactor core assembly 100. In these embodiments, the reactor pressure vessel 12 suitably is surrounded by a region (not shown) of isolation material, such as dry sand, for long-term environmental isolation. The region (not shown) of isolation material may have a size of around 100 m in diameter or so. However, in other embodiments, the reactor pressure vessel 12 is sited on or toward the Earth's surface.

Reactor coolant loops 14 transfer heat from nuclear fission in the nuclear fission reactor core assembly 100 to application heat exchangers 16. The reactor coolant may be selected as desired for a particular application. In some embodiments, the reactor coolant suitably is helium (He) gas. In other embodiments, the reactor coolant suitably may be other pressurized inert gases, such as neon, argon, krypton, xenon, or other fluids such as water or gaseous or superfluidic carbon dioxide, or liquid metals, such as sodium or lead, or metal alloys, such as Pb—Bi, or organic coolants, such as polyphenyls, or fluorocarbons. The reactor coolant loops suitably may be made from tantalum (Ta), tungsten (W), aluminum (Al), steel or other ferrous or non-iron groups alloys or titanium or zirconium-based alloys, or from other metals and alloys, or from other structural materials or composites, as desired.

In some embodiments, the application heat exchangers 16 may be steam generators that generate steam that is provided as a prime mover for rotating machinery, such as electrical turbine-generators 18 within an electrical generating station 20. In such a case, the nuclear fission reactor core assembly 100 suitably operates at a high operating pressure and temperature, such as above 1,000K or so and the steam generated in the steam generator may be superheated steam. In other embodiments, the application heat exchanger 16 may be any steam generator that generates steam at lower pressures and temperatures (that is, need not be not superheated steam) and the nuclear fission reactor core assembly 100 operates at temperatures less than around 550K. In these cases, the application heat exchangers 16 may provide process heat for applications such as desalination plants for seawater or for processing biomass by distillation into ethanol, or the like.

Optional reactor coolant pumps 22 circulate reactor coolant through the nuclear fission reactor core assembly 100 and the application heat exchangers 16. Note that although the illustrative embodiment shows pumps and gravitationally driven circulation, other approaches may not utilize pumps, or circulatory structures or be otherwise similarly geometrically limited. The reactor coolant pumps 22 suitably are provided when the nuclear fission reactor core assembly 100 is sited approximately vertically coplanar with the application heat exchangers 16, such that thermal driving head is not generated. The reactor coolant pumps 22 may also be provided when the nuclear fission reactor core assembly 100 is sited underground. However, when the nuclear fission reactor core assembly 100 is sited underground or in any fashion so the nuclear fission reactor core assembly 100 is vertically spaced below the application heat exchangers 16, thermal driving head may be developed between the reactor coolant exiting the reactor pressure vessel 12 and the reactor coolant exiting the application heat exchangers 16 at a lower temperature than the reactor coolant exiting the reactor pressure vessel 12. When sufficient thermal driving head exists, the reactor coolant pumps 22 need not be provided in order to provide sufficient circulation of reactor coolant through the nuclear fission reactor core assembly 100 to remove heat from fission during operation at power.

In some embodiments more than one reactor coolant loop 14 may be provided, thereby providing redundancy in the event of a casualty, such as a loss of coolant accident (LOCA) or a loss of flow accident (LOFA) or a primary-to-secondary leak or the like, to any one of the other reactor coolant loops 14. Each reactor coolant loop 14 is typically rated for full-power operation, though some applications may remove this constraint.

In some embodiments, one-time closures 24, such as reactor coolant shutoff valves, are provided in lines of the reactor coolant system 14. In each reactor coolant loop 14 provided, a closure 24 is provided in an outlet line from the reactor pressure vessel 12 and in a return line to the reactor pressure vessel 12 from an outlet of the application heat exchanger 16. The one-time closures 24 are fast-acting closures that shut quickly under emergency conditions, such as detection of significant fission-product entrainment in reactor coolant). The one-time closures 24 are provided in addition to a redundant system of automatically-actuated conventional valves (not shown).

Heat-dump heat exchangers 26 are provided for removal of after-life heat (decay heat). The heat-dump heat exchanger 26 includes a primary loop that is configured to circulate decay heat removal coolant through the nuclear fission reactor core assembly 100. The heat-dump heat exchanger 26 includes a secondary loop that is coupled to an engineered heat-dump heat pipe network (not shown). In some situations, for example, for redundancy purposes, more than one the heat-dump heat exchanger 26 may be provided. Each of the heat-dump heat exchangers 26 provided may be sited at a vertical distance above the nuclear fission reactor core assembly 100 so sufficient thermal driving head is provided to enable natural flow of decay heat removal coolant without need for decay heat removal coolant pumps. However, in some embodiments decay heat removal pumps (not shown) may be provided or, if provided, the reactor coolant pumps may be used for decay heat removal, where appropriate.

Now that an overview of an illustrative embodiment of the reactor 10 has been given, other embodiments and aspects will be discussed. First, embodiments and aspects of the nuclear fission reactor core assembly 100 will be discussed. An overview of the nuclear fission reactor core assembly 100 and its nucleonics and propagation of a nuclear fission deflagration wave will be set forth first, followed by descriptions of illustrative embodiments and other aspects of the nuclear fission reactor core assembly 100.

Given by way of overview and in general terms, structural components of the reactor core assembly 100 may be made of tantalum (Ta), tungsten (W), rhenium (Re), or carbon composite, ceramics, or the like. These materials are suitable because of the high temperatures at which the nuclear fission reactor core assembly 100 operates, and because of their creep resistance over the envisioned lifetime of full power operation, mechanical workability, and corrosion resistance. Structural components can be made from single materials, or from combinations of materials (e.g., coatings, alloys, multi-layers, composites, and the like). In some embodiments, the reactor core assembly 100 operates at sufficiently lower temperatures so that other materials, such as aluminum (Al), steel, titanium (Ti) or the like can be used, alone or in combinations, for structural components.

The nuclear fission reactor core assembly 100 includes the nuclear fission igniter 110 and a larger nuclear fission deflagration burn-wave-propagating region. The nuclear fission deflagration burn-wave-propagating region suitably contains thorium or uranium fuel, and functions on the general principle of fast neutron spectrum fission breeding. In some embodiments, uniform temperature throughout the nuclear fission reactor core assembly 100 is maintained by thermostating modules which regulate local neutron flux and thereby control local power production.

The nuclear fission reactor core assembly 100 suitably is a breeder for reasons of efficient nuclear fission fuel utilization and of minimization of requirements for isotopic enrichment. Further, and referring now to FIGS. 1B and 1C, the nuclear fission reactor core assembly 100 suitably utilizes a fast neutron spectrum because the high absorption cross-section of fission products for thermal neutrons typically does not permit utilization of more than about 1% of thorium or of the more abundant uranium isotope, $U^{238}$, in uranium-fueled embodiments, without removal of fission products.

Figure 1B:
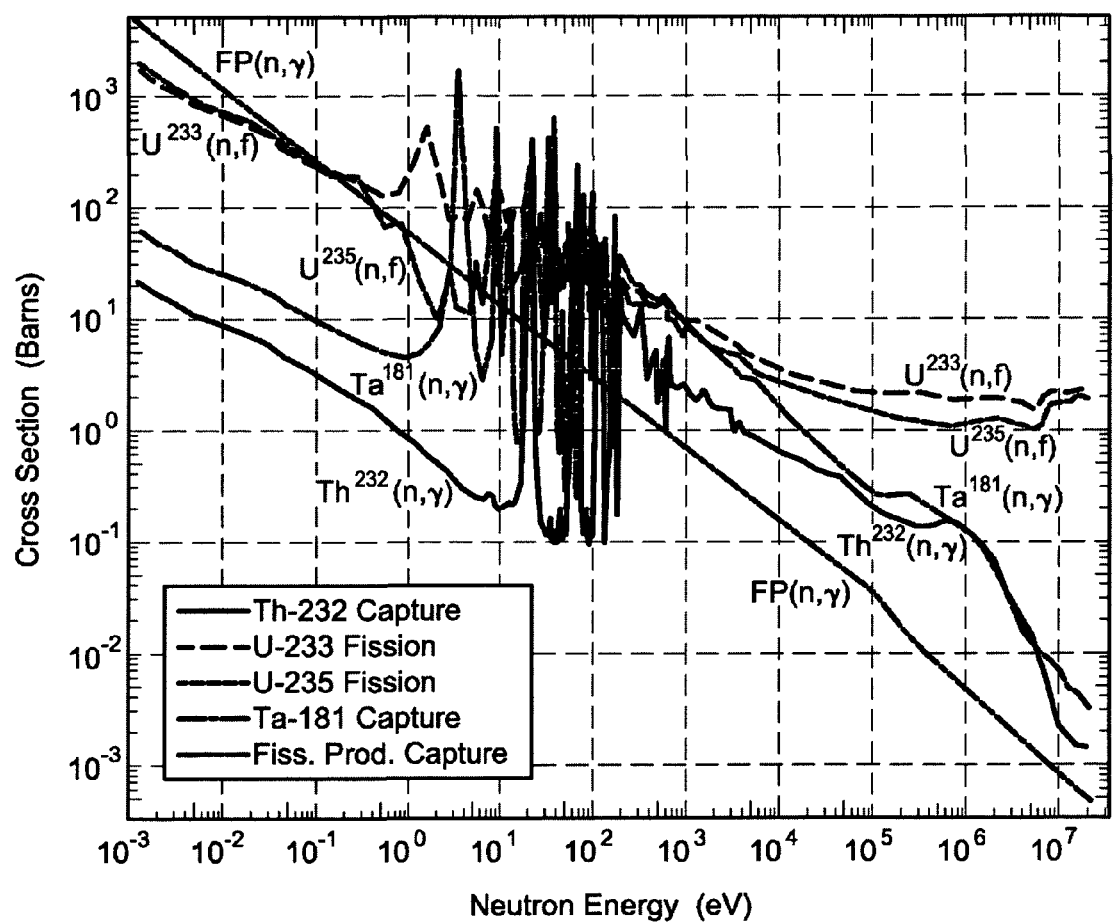
FIGS. 1B and 1C plot cross-section versus neutron energy.

In FIG. 1B, cross-sections for the dominant neutron-driven nuclear reactions of interest for the $Th^{232}$-fueled embodiments are plotted over the neutron energy range $10^{-3}$-$10^7$ eV. It can be seen that losses to radiative capture on fission product nuclei dominate neutron economies at near-thermal (~0.1 eV) energies, but are comparatively negligible above the resonance capture region (between ~3-300 eV). Thus, operating with a fast neutron spectrum when attempting to realize a high-gain fertile-to-fissile breeder can help to preclude fuel recycling (that is, periodic or continuous removal of fission products). The radiative capture cross-sections for fission products shown are those for intermediate-Z nuclei resulting from fast neutron-induced fission that have undergone subsequent beta-decay to negligible extents. Those in the central portions of the burn-waves of embodiments of the nuclear fission reactor core assembly 100 will have undergone some decay and thus will have somewhat higher neutron avidity. However, parameter studies have indicated that core fuel-burning results may be insensitive to the precise degree of such decay.

Figure 1C:
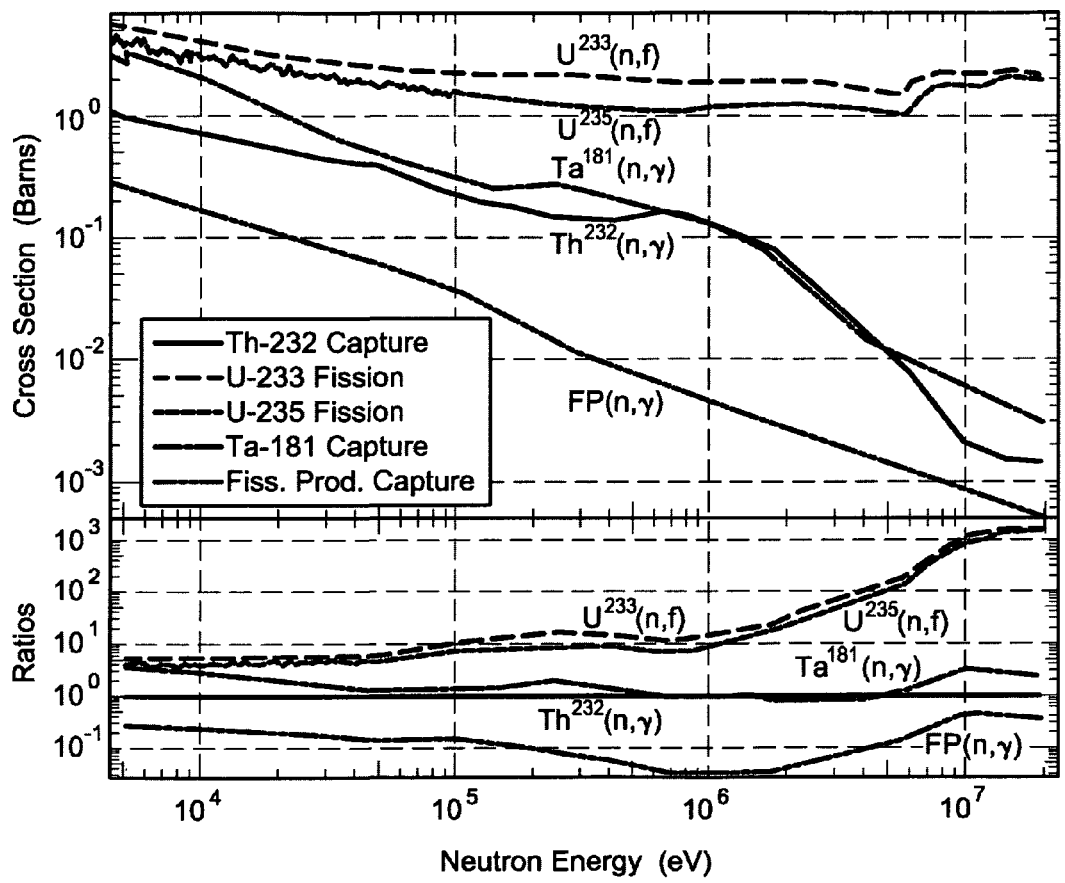

In FIG. 1C, cross-sections for the dominant neutron-driven nuclear reactions of primary interest for the $Th^{232}$-fueled embodiments are plotted over the most interesting portion of the neutron energy range, between $>10^4$ and $<10^{6.5}$ eV, in the upper portion of FIG. 1C. The neutron spectrum of embodiments of the reactor 10 peaks in the $\geq 10^5$ eV neutron energy region. The lower portion of FIG. 1C contains the ratio of these cross-sections vs. neutron energy to the cross-section for neutron radiative capture on $Th^{232}$, the fertile-to-fissile breeding step (as the resulting $Th^{233}$ swiftly beta-decays to $Pa^{233}$, which then relatively slowly beta-decays to $U^{233}$, analogously to the $U^{239}$—$Np^{239}$—$Pu^{239}$ beta decay-chain upon neutron capture by $U^{238}$).

It can be seen that losses to radiative capture on fission products can be comparatively negligible over the neutron energy range of interest, and furthermore that atom-fractions of a few tens of percent of high-performance structural material, such as Ta, will impose tolerable loads on the neutron economy in the nuclear fission reactor core assembly 100. These data also suggest that core-averaged fuel burn-up in excess of 50% can be realizable, and that fission product-to-fissile atom-ratios behind the nuclear fission deflagration wave when reactivity is finally driven negative by fission-product accumulation will be approximately 10:1.

Origination and Propagation of Nuclear Fission Deflagration Wave Burnfront

An illustrative nuclear fission deflagration wave within the nuclear fission reactor core assembly 100 will now be explained. Propagation of deflagration burning-waves through combustible materials can release power at predictable levels. Moreover, if the material configuration has the appropriate time-invariant features, the ensuing power production may be at a steady level. Finally, if deflagration wave propagation-speed may be externally modulated in a practical manner, the energy release-rate and thus power production may be controlled as desired.

Sustained nuclear fission deflagration waves are rare in nature, due to disassembly of the initial nuclear fission fuel configuration as a hydrodynamic consequence of energy release during the earliest phases of wave propagation, in the absence of some control.

However, in embodiments of the nuclear fission reactor core assembly 100 a nuclear fission deflagration wave can be initiated and propagated in a sub-sonic manner in fissionable fuel whose pressure is substantially independent of its temperature, so that its hydrodynamics is substantially 'clamped'. The nuclear fission deflagration wave's propagation speed within the nuclear fission reactor core assembly 100 can be controlled in a manner conducive to large-scale power generation, such as in an electricity-producing reactor system like embodiments of the reactor 10.

Nucleonics of the nuclear fission deflagration wave are explained below. Inducing nuclear fission of selected isotopes of the actinide elements—the fissile ones—by capture of neutrons of any energy permits the release of nuclear binding energy at any material temperature, including arbitrarily low ones. The neutrons that are captured by the fissile actinide element may be provided by the nuclear fission igniter 110.

Release of more than a single neutron per neutron captured, on the average, by nuclear fission of substantially any actinide isotope can provide opportunity for a diverging neutron-mediated nuclear-fission chain reaction in such materials. Release of more than two neutrons for every neutron which is captured (over certain neutron-energy ranges, on the average)

by nuclear fission by some actinide isotopes may permit first converting an atom of a non-fissile isotope to a fissile one (via neutron capture and subsequent beta-decay) by an initial neutron capture, and then of neutron-fissioning the nucleus of the newly-created fissile isotope in the course of a second neutron capture.

Most really high-Z (Z≥90) nuclear species can be combusted if, on the average, one neutron from a given nuclear fission event can be radiatively captured on a non-fissile-but-'fertile' nucleus which will then convert (such as via beta-decay) into a fissile nucleus and a second neutron from the same fission event can be captured on a fissile nucleus and, thereby, induce fission. In particular, if either of these arrangements is steady-state, then sufficient conditions for propagating a nuclear fission deflagration wave in the given material can be satisfied.

Due to beta-decay in the process of converting a fertile nucleus to a fissile nucleus, the characteristic speed of wave advance is of the order of the ratio of the distance traveled by a neutron from its fission-birth to its radiative capture on a fertile nucleus (that is, a mean free path) to the half-life of the (longest-lived nucleus in the chain of) beta-decay leading from the fertile nucleus to the fissile one. Such a characteristic fission neutron-transport distance in normal-density actinides is approximately 10 cm and the beta-decay half-life is $10^5$-$10^6$ seconds for most cases of interest. Accordingly for some designs, the characteristic wave-speed is $10^{-4}$-$10^{-7}$ cm sec$^{-1}$, or approximately $10^{-13}$-$10^{-14}$ of that of a typical nuclear detonation wave. Such a relatively slow speed-of-advance indicates that the wave can be characterized as a deflagration wave, rather than a detonation wave.

If the deflagration wave attempts to accelerate, its leading-edge counters ever-more-pure fertile material (which is quite lossy in a neutronic sense), for the concentration of fissile nuclei well ahead of the center of the wave becomes exponentially low. Thus the wave's leading-edge (referred to herein as a "burnfront") stalls or slows. Conversely, if the wave slows, the local concentration of fissile nuclei arising from continuing beta-decay increases, the local rates of fission and neutron production rise, and the wave's leading-edge, that is the burnfront, accelerates.

Finally, if the heat associated with nuclear fission is removed sufficiently rapidly from all portions of the configuration of initially fertile matter in which the wave is propagating, the propagation may take place at an arbitrarily low material temperature—although the temperatures of both the neutrons and the fissioning nuclei may be around 1 MeV.

Such conditions for initiating and propagating a nuclear fission deflagration wave can be realized with readily available materials. While fissile isotopes of actinide elements are rare terrestrially, both absolutely and relative to fertile isotopes of these elements, fissile isotopes can be concentrated, enriched and synthesized. The use of both naturally-occurring and man-made ones, such as $U^{235}$ and $Pu^{239}$, respectively, in initiating and propagating nuclear fission detonation waves is well-known.

Consideration of pertinent neutron cross-sections (shown in FIGS. 1B and 1C) suggests that a nuclear fission deflagration wave can burn a large fraction of a core of naturally-occurring actinides, such as $Th^{232}$ or $U^{238}$, if the neutron spectrum in the wave is a 'hard' or 'fast' one. That is, if the neutrons which carry the chain reaction in the wave have energies which are not very small compared to the approximately 1 MeV at which they are evaporated from nascent fission fragments, then relatively large losses to the space-time-local neutron economy can be avoided when the local mass-fraction of fission products becomes comparable to that of the fertile material (recalling that a single mole of fissile material fission-converts to two moles of fission-product nuclei). Even neutronic losses to typical neutron-reactor structural materials, such as Ta, which has desirable high-temperature properties, may become substantial at neutron energies ≤0.1 MeV.

Another consideration is the (comparatively small) variation with incident neutron energy of the neutron multiplicity of fission, ν, and the fraction of all neutron capture events which result in fission (rather than merely γ-ray emission). The algebraic sign of the function α(ν−2) constitutes a condition for the feasibility of nuclear fission deflagration wave propagation in fertile material compared with the overall fissile isotopic mass budget, in the absence of neutron leakage from the core or parasitic absorptions (such as on fission products) within its body, for each of the fissile isotopes of the nuclear fission reactor core assembly 100. The algebraic sign is generally positive for all fissile isotopes of interest, from fission neutron-energies of approximately 1 MeV down into the resonance capture region.

The quantity α(ν−2)/ν upper-bounds the fraction of total fission-born neutrons which may be lost to leakage, parasitic absorption, or geometric divergence during deflagration wave propagation. It is noted that this fraction is 0.15-0.30 for the major fissile isotopes over the range of neutron energies which prevails in all effectively unmoderated actinide isotopic configurations of practical interest (approximately 0.1-1.5 MeV). In contrast to the situation prevailing for neutrons of (epi-) thermal energy (see FIG. 1C), in which the parasitic losses due to fission products dominate those of fertile-to-fissile conversion by 1-1.5 decimal orders-of-magnitude, fissile element generation by capture on fertile isotopes is favored over fission-product capture by 0.7-1.5 orders-of-magnitude over the neutron energy range 0.1-1.5 MeV. The former suggests that fertile-to-fissile conversion will be feasible only to the extent of 1.5-5% percent at-or-near thermal neutron energies, while the latter indicates that conversions in excess of 50% may be expected for near-fission energy neutron spectra.

In considering conditions for propagation of a nuclear fission deflagration wave, in some approaches neutron leakage may be effectively ignored for very large, "self-reflected" actinide configurations. Referring to FIG. 1C and analytic estimates of the extent of neutron moderation-by-scattering entirely on actinide nuclei, it will be appreciated that deflagration wave propagation can be established in sufficiently large configurations of the two types of actinides that are relatively abundant terrestrially: $Th^{232}$ and $U^{238}$, the exclusive and the principal (that is, longest-lived) isotopic components of naturally-occurring thorium and uranium, respectively.

Specifically, transport of fission neutrons in these actinide isotopes will likely result in either capture on a fertile isotopic nucleus or fission of a fissile one before neutron energy has decreased significantly below 0.1 MeV (and thereupon becomes susceptible with non-negligible likelihood to capture on a fission-product nucleus). Referring to FIG. 1B, it will be appreciated that fission product nuclei concentrations can significantly exceed fertile ones and fissile nuclear concentrations may be an order-of-magnitude less than the lesser of fission-product or fertile ones while remaining quantitatively substantially reliable. Consideration of pertinent neutron scattering cross-sections suggests that right circular cylindrical configurations of actinides which are sufficiently extensive to be effectively infinitely thick—that is, self-reflecting—to fission neutrons in their radial dimension will have density-radius products >>200 gm/cm$^2$—that is, they will have radii >>10-20 cm of solid-density U$^{238}$—Th$^{232}$.

The breeding-and-burning wave provides sufficient excess neutrons to breed new fissile material 1-2 mean-free-paths into the yet-unburned fuel, effectively replacing the fissile fuel burnt in the wave. The 'ash' behind the burn-wave's peak is substantially 'neutronically neutral', since the neutronic reactivity of its fissile fraction is just balanced by the parasitic absorptions of structure and fission product inventories on top of leakage. If the fissile atom inventory in the wave's center and just in advance of it is time-stationary as the wave propagates, then it is doing so stably; if less, then the wave is 'dying', while if more, the wave may be said to be 'accelerating.'

Thus, a nuclear fission deflagration wave may be propagated and maintained in substantially steady-state conditions for long time intervals in configurations of naturally-occurring actinide isotopes.

The above discussion has considered, by way of non-limiting example, circular cylinders of natural uranium or thorium metal of less than a meter or so diameter—and that may be substantially smaller in diameter if efficient neutron reflectors are employed—that may stably propagate nuclear fission deflagration waves for arbitrarily great axial distances. However, propagation of nuclear fission deflagration waves is not to be construed to be limited to circular cylinders, to symmetric geometries, or to singly-connected geometries. To that end, additional embodiments of alternate geometries of the nuclear fission reactor core assembly 100 are described in U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, AND LOWELL L. WOOD, JR. as inventors, filed 28 Nov. 2006, the entire contents of which are hereby incorporated by reference.

Propagation of a nuclear fission deflagration wave has implications for embodiments of the nuclear fission reactor 10. As a first example, local material temperature feedback can be imposed on the local nuclear reaction rate at an acceptable expense in the deflagration wave's neutron economy. Such a large negative temperature coefficient of neutronic reactivity confers an ability to control the speed-of-advance of the deflagration wave. If very little thermal power is extracted from the burning fuel, its temperature rises and the temperature-dependent reactivity falls, and the nuclear fission rate at wave-center becomes correspondingly small and the wave's equation-of-time reflects only a very small axial rate-of-advance. Similarly, if the thermal power removal rate is large, the material temperature decreases and the neutronic reactivity rises, the intra-wave neutron economy becomes relatively undamped, and the wave advances axially relatively rapidly. Details regarding illustrative implementations of temperature feedback within embodiments of the nuclear fission reactor core assembly 100 are described in U.S. patent application Ser. No. 11/605,933, entitled CONTROLLABLE LONG TERM OPERATION OF A NUCLEAR REACTOR, naming RODERICK A. HYDE, MURIEL Y. ISHIKAWA, NATHAN P. MYHRVOLD, AND LOWELL L. WOOD, JR. as inventors, filed 28 Nov. 2006, the entire contents of which are hereby incorporated by reference.

As a second example of implications of propagation of a nuclear fission deflagration wave on embodiments of the nuclear fission reactor 10, less than all of the total fission neutron production in the nuclear fission reactor 10 may be utilized. For example, the local material-temperature thermostating modules may use around 5-10% of the total fission neutron production in the nuclear fission reactor 10. Another ≤10% of the total fission neutron production in the nuclear fission reactor 10 may be lost to parasitic absorption in the relatively large quantities of high-performance, high temperature, structure materials (such as Ta, W, or Re) employed in structural components of the nuclear fission reactor 10. This loss occurs in order to realize ≥60% thermodynamic efficiency in conversion to electricity and to gain high system safety figures-of-merit. The Zs of these materials, such as Ta, W and Re, are approximately 80% of that of the actinides, and thus their radiative capture cross-sections for high-energy neutrons are not particularly small compared to those of the actinides, as is indicated for Ta in FIGS. 1B and 1C. A final 5-10% of the total fission neutron production in the nuclear fission reactor 10 may be lost to parasitic absorption in fission products. As noted above, the neutron economy characteristically is sufficiently rich that approximately 0.7 of total fission neutron production is sufficient to sustain deflagration wave-propagation in the absence of leakage and rapid geometric divergence. This is in sharp contrast with (epi) thermal-neutron power reactors employing low-enrichment fuel, for which neutron-economy discipline in design and operation must be strict.

Figure 1D:
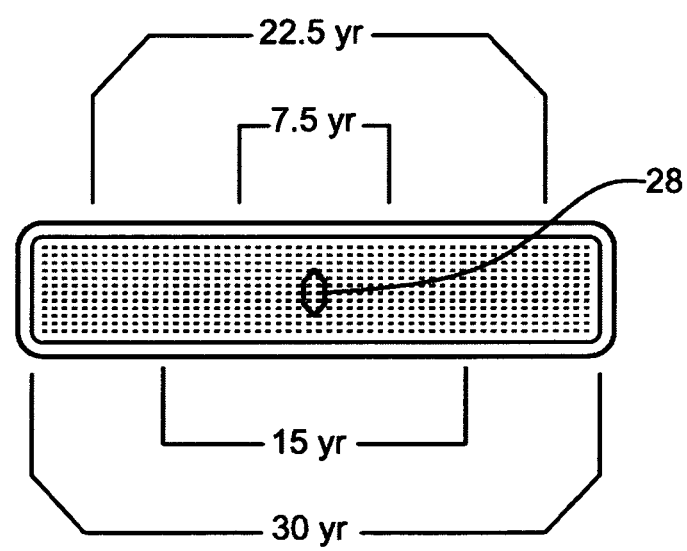
FIGS. 1D through 1H illustrate relative concentrations during times at operation of a nuclear fission reactor at power.
Figure 1E:
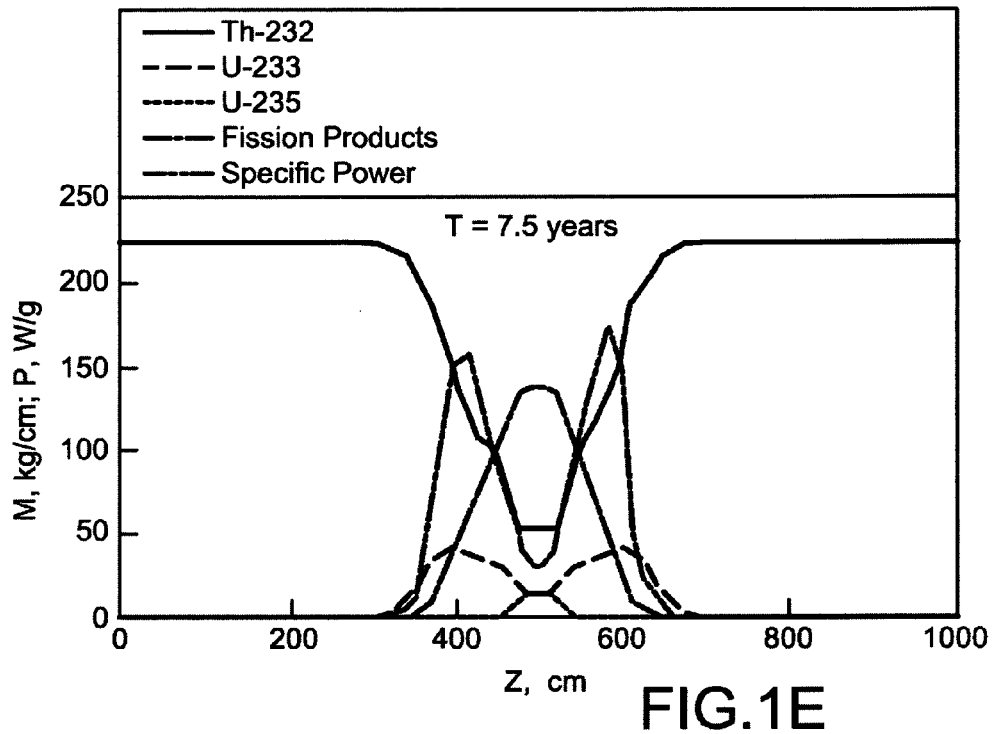
Figure 1F:
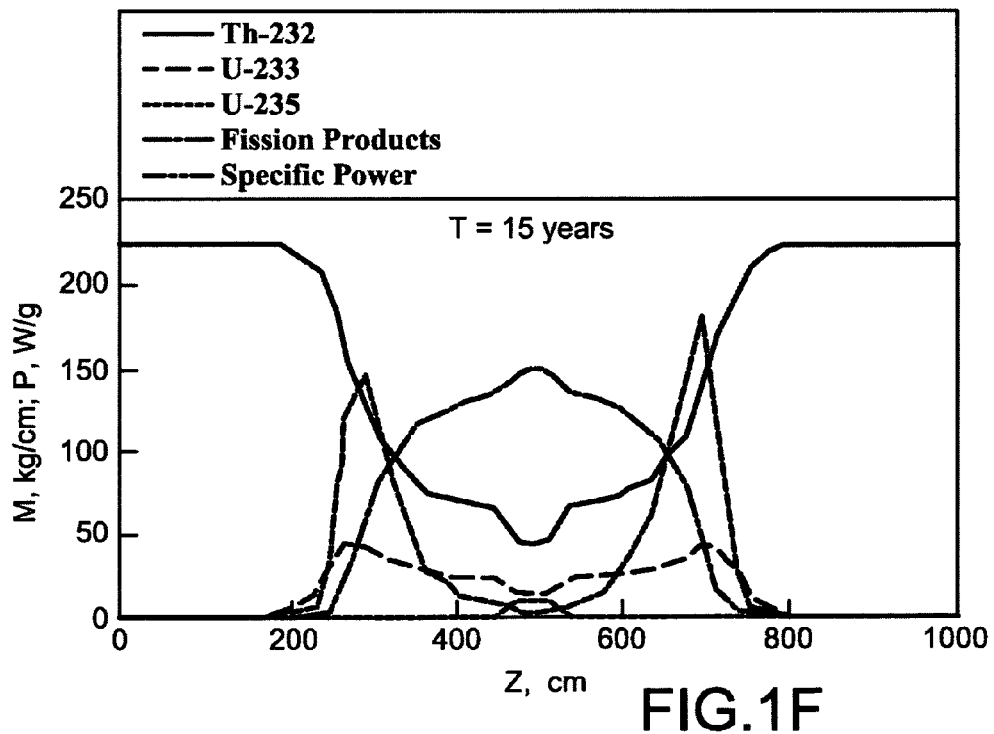
Figure 1G:
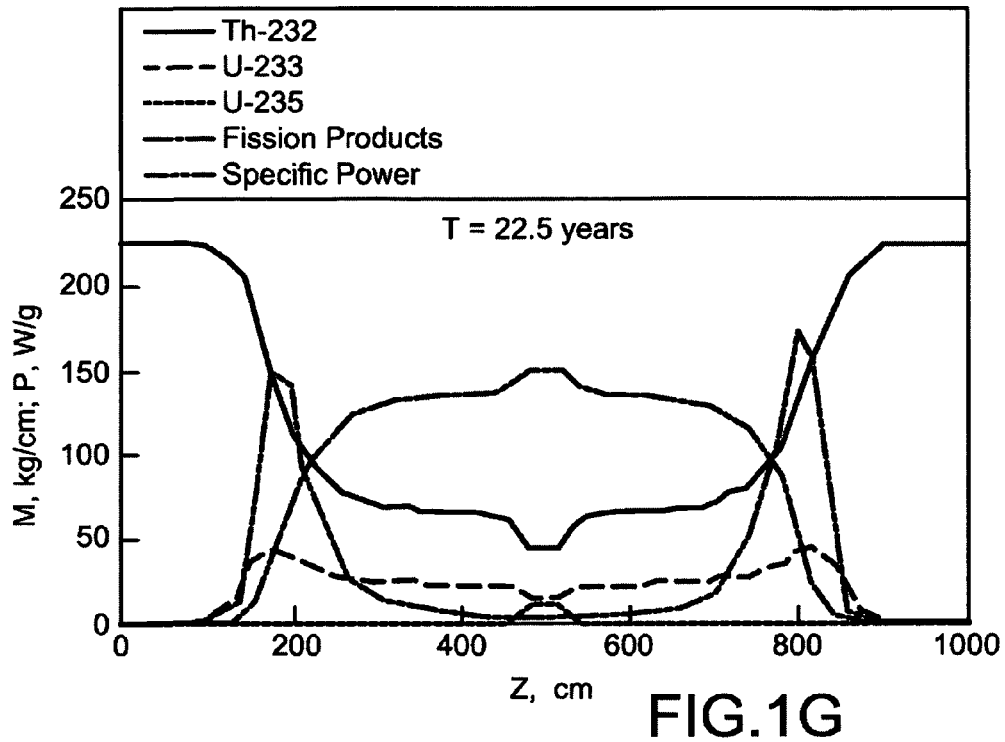
Figure 1H:
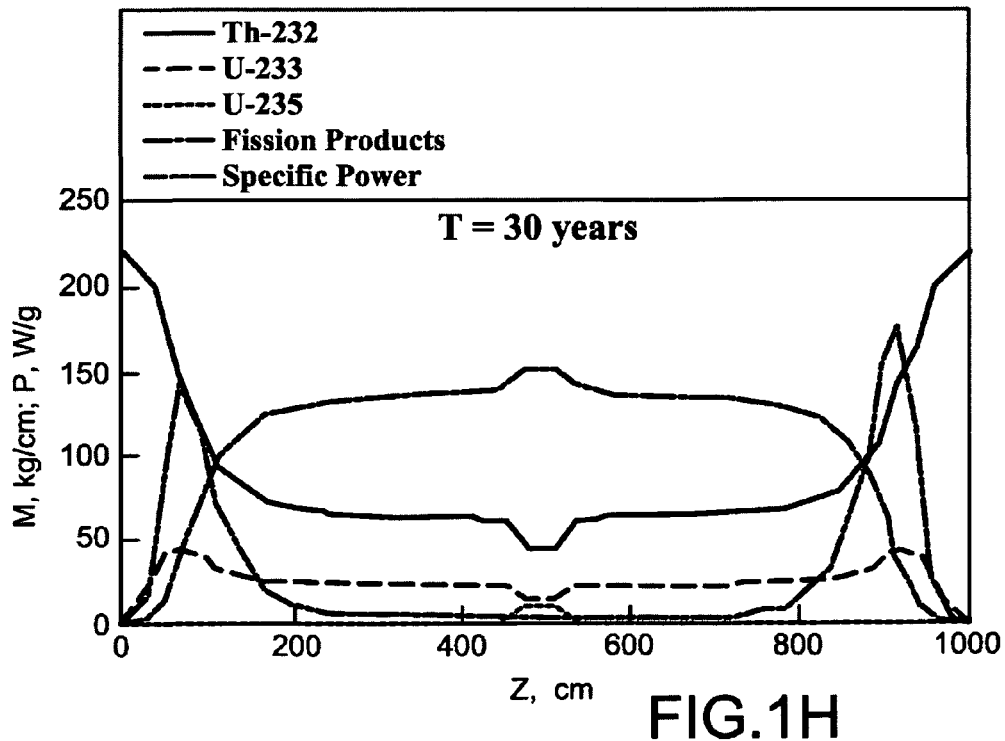

As a third example of implications of propagation of a nuclear fission deflagration wave on embodiments of the nuclear fission reactor 10, high burn-ups (on the order of around 50% to around 80%) of initial actinide fuel-inventories which are characteristic of the nuclear fission deflagration waves permit high-efficiency utilization of as-mined fuel—moreover without a requirement for reprocessing. Referring now to FIGS. 1D-1H, features of the fuel-charge of embodiments of the nuclear fission reactor core assembly 100 are depicted at four equi-spaced times during the operational life of the reactor after origination of the nuclear fission deflagration wave (referred to herein as "nuclear fission ignition") in a scenario in which full reactor power is continuously demanded over a ⅓ century time-interval. In the embodiment shown, two nuclear fission deflagration wavefronts propagate from an origination point 28 (near the center of the nuclear fission reactor core assembly 100 and in which the nuclear fission igniter 110 is located) toward ends of the nuclear fission reactor core assembly 100. Corresponding positions of the leading edge of the nuclear fission deflagration wave-pair at various time-points after full ignition of the fuel-charge of the nuclear fission reactor core assembly 100 are indicated in FIG. 1D. FIGS. 1E, 1F, 1G, and 1G illustrate masses (in kg of total mass per cm of axial core-length) of various isotopic components in a set of representative near-axial zones and fuel specific power (in W/g) at the indicated axial position as ordinate-values versus axial position along an illustrative, non-limiting 10-meter-length of the fuel-charge as an abscissal value at approximate times after nuclear fission ignition of approximately 7.5 years, 15 years, 22.5 years, and 30 years, respectively. The central perturbation is due to the presence of the nuclear fission igniter 110 indicated by the origination point 28 (FIG. 1D).

It will be noted that the neutron flux from the most intensely burning region behind the burnfront breeds a fissile isotope-rich region at the burnfront's leading-edge, thereby serving to advance the nuclear fission deflagration wave. After the nuclear fission deflagration wave's burnfront has swept over a given mass of fuel, the fissile atom concentration continues to rise for as long as radiative capture of neutrons on available fertile nuclei is considerably more likely than on fission product nuclei, while ongoing fission generates an ever-greater mass of fission products. Nuclear power-production density peaks in this region of the fuel-charge, at any given moment. It will also be noted that in the illustrated embodiments, differing actions of two slightly different types of thermostating units on the left and the right sides of the nuclear fission igniter 110 account for the corresponding slightly differing power production levels.

Still referring to FIGS. 1D-1H, it can be seen that well behind the nuclear fission deflagration wave's advancing burnfront, the concentration ratio of fission product nuclei (whose mass closely averages half that of a fissile nucleus) to fissile ones climbs to a value comparable to the ratio of the fissile fission to the fission product radiative capture cross-sections (FIG. 1B), the "local neutronic reactivity" thereupon goes slightly negative, and both burning and breeding effectively cease—as will be appreciated from comparing FIGS. 1E, 1F, 1G, and 1H with each other, far behind the nuclear fission deflagration wave burnfront.

In some embodiments of the nuclear fission reactor 10, all the nuclear fission fuel ever used in the reactor is installed during manufacture of the nuclear fission reactor core assembly 100, and no spent fuel is ever removed from the nuclear fission reactor core assembly 100, which is never accessed after nuclear fission ignition. However, in some other embodiments of the nuclear fission reactor 10, additional nuclear fission fuel is added to the nuclear fission reactor core assembly 100 after nuclear fission ignition. However, in some other embodiments of the nuclear fission reactor 10, spent fuel is removed from the reactor core assembly (and, in some embodiments, removal of spent fuel from the nuclear fission reactor core assembly 100 may be performed while the nuclear fission reactor 10 is operating at power). Such illustrative refueling and defueling is explained in U.S. patent application Ser. No. 11/605,848, entitled METHOD AND SYSTEM FOR PROVIDING FUEL IN A NUCLEAR REACTOR, naming RODERICK A. HYDE, MURIEL Y. ISHIKAWA, NATHAN P. MYHRVOLD, AND LOWELL L. WOOD, JR. as inventors, filed 28 Nov. 2006, the contents of which are hereby incorporated by reference. Regardless of whether or not spent fuel is removed, pre-expansion of the as-loaded fuel permits higher-density actinides to be replaced with lower-density fission products without any overall volume changes in fuel elements, as the nuclear fission deflagration wave sweeps over any given axial element of actinide 'fuel,' converting it into fission-product 'ash.'

Given by way of overview, launching of nuclear fission deflagration waves into $Th^{232}$ or $U^{238}$ fuel-charges is readily accomplished with 'nuclear fission igniter modules' enriched in fissile isotopes. Illustrative nuclear fission igniter modules and methods for launching nuclear fission deflagration waves will be discussed in detail further below. Higher enrichments result in more compact modules, and minimum mass modules may employ moderator concentration gradients. In addition, nuclear fission igniter module design may be determined in part by non-technical considerations, such as resistance to materials diversion for military purposes in various scenarios.

While the illustrative nuclear fission igniter of the previously described embodiments included nuclear fission material configured to initiate propagation of the burning wavefront, in other approaches, illustrative nuclear fission igniters may have other types of reactivity sources. For example, other nuclear fission igniters may include "burning embers", e.g., nuclear fission fuel enriched in fissile isotopes via exposure to neutrons within a propagating nuclear fission deflagration wave reactor. Such "burning embers" may function as nuclear fission igniters, despite the presence of various amounts of fission products "ash". In other approaches to launching a nuclear fission deflagration wave, the illustrative nuclear fission igniter modules described herein may be used to supplement other neutron sources that use electrically driven sources of high energy ions (such as protons, deuterons, alpha particles, or the like) or electrons that may in turn produce neutrons. In one illustrative approach, a particle accelerator, such as a linear accelerator may be positioned to provide high energy protons to an intermediate material that may in turn provide such neutrons (e.g., through spallation). In another illustrative approach, a particle accelerator, such as a linear accelerator may be positioned to provide high energy electrons to an intermediate material that may in turn provide such neutrons (e.g., by electro-fission and/or photofission of high-Z elements). Alternatively, other known neutron emissive processes and structures, such as electrically induced fusion approaches, may provide neutrons (e.g., 14 Mev neutrons from D-T fusion) that may thereby be used in addition to the illustrative nuclear fission igniters described herein to initiate the propagating fission wave.

Now that nucleonics of the fuel charge and the nuclear fission deflagration wave have been discussed, further details regarding "nuclear fission ignition" and maintenance of the nuclear fission deflagration wave will be discussed. A centrally-positioned illustrative nuclear fission igniter (such as those that will be described in detail further below) moderately enriched in fissionable material, such as $U^{235}$ or $Pu^{239}$, has a neutron-absorbing material (such as a borohydride) removed from it (such as by operator-commanded electrical heating), and the nuclear fission igniter becomes neutronically critical. Local fuel temperature rises to a design setpoint and is regulated thereafter by the local thermostating modules (discussed in detail in U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, AND LOWELL L. WOOD, JR. as inventors, filed 28 Nov. 2006, the entire contents of which are hereby incorporated by reference). Neutrons from the fast fission of $U^{235}$ or $Pu^{239}$ are mostly captured at first on local $U^{238}$ or $Th^{232}$.

It will be appreciated that uranium enrichment of the nuclear fission igniter may be reduced to levels not much greater than that of light water reactor (LWR) fuel by introduction into the nuclear fission igniter and the fuel region immediately surrounding it of a radial density gradient of a refractory moderator, such as graphite. High moderator density enables low-enrichment fuel to burn satisfactorily, while decreasing moderator density permits efficient fissile breeding to occur. Thus, optimum nuclear fission igniter design may involve trade-offs between proliferation robustness and the minimum latency from initial criticality to the availability of full-rated-power from the fully-ignited fuel-charge of the core. Lower nuclear fission igniter enrichments entail more breeding generations and thus impose longer latencies.

The peak (unregulated) reactivity of the nuclear fission reactor core assembly 100 slowly decreases in the first phase of the nuclear fission ignition process because, although the total fissile isotope inventory is increasing monotonically, this total inventory is becoming more spatially dispersed. As a result of choice of initial fuel geometry, fuel enrichment versus position, and fuel density, it may be arranged for the maximum reactivity to still be slightly positive at the time-point at which its minimum value is attained. Soon thereafter, the maximum reactivity begins to increase rapidly toward its greatest value, corresponding to the fissile isotope inventory in the region of breeding substantially exceeding that remaining in the nuclear fission igniter. A quasi-spherical annular shell then provides maximum specific power production. At this point, the fuel-charge of the nuclear fission reactor core assembly 100 is referred to as "ignited."

Now that the fuel-charge of the nuclear fission reactor core assembly 100 has been "ignited", propagation of the nuclear fission deflagration wave, also referred to herein as "nuclear fission burning", will now be discussed. The spherically-diverging shell of maximum specific nuclear power production continues to advance radially from the nuclear fission igniter toward the outer surface of the fuel charge. When it reaches this surface, it naturally breaks into two spherical zonal surfaces, with one surface propagating in each of the two opposite directions along the axis of the cylinder. At this time-point, the full thermal power production potential of the core has been developed. This interval is characterized as that of the launching of the two axially-propagating nuclear fission deflagration wave burnfronts. In some embodiments the center of the core's fuel-charge is ignited, thus generating two oppositely-propagating waves. This arrangement doubles the mass and volume of the core in which power production occurs at any given time, and thus decreases by two-fold the core's peak specific power generation, thereby quantitatively minimizing thermal transport challenges. However, in other embodiments, the core's fuel charge is ignited at one end, as desired for a particular application. In other embodiments, the core's fuel charge may be ignited in multiple sites. In yet other embodiments, the core's fuel charge is ignited at any 3-D location within the core as desired for a particular application. In some embodiments, two propagating nuclear fission deflagration waves will be initiated and propagate away from a nuclear fission ignition site, however, depending upon geometry, nuclear fission fuel composition, the action of neutron modifying control structures or other considerations, different numbers (e.g., one, three, or more) of nuclear fission deflagration waves may be initiated and propagated. However, for sake of understanding, the discussion herein refers, without limitation, to propagation of two nuclear fission deflagration wave burnfronts.

From this time forward through the break-out of the two waves when they reach the two opposite ends, the physics of nuclear power generation is effectively time-stationary in the frame of either wave, as illustrated in FIGS. 1E-1H. The speed of wave advance through the fuel is proportional to the local neutron flux, which in turn is linearly dependent on the thermal power demanded from the nuclear fission reactor core assembly 100 via the collective action on the nuclear fission deflagration wave's neutron budget of the thermostating modules (not shown).

When more power is demanded from the reactor via lower-temperature coolant flowing into the core, the temperature of the two ends of the core (which in some embodiments are closest to the coolant inlets) decreases slightly below the thermostating modules' design set-point, a neutron absorber is thereby withdrawn from the corresponding sub-population of the core's thermostating modules, and the local neutron flux is permitted thereby to increase to bring the local thermal power production to the level which drives the local material temperature up to the set-point of the local thermostating modules.

However, in the two burnfront embodiment this process is not effective in heating the coolant significantly until its two divided flows move into the two nuclear burn-fronts. These two portions of the core's fuel-charge—which are capable of producing significant levels of nuclear power when not suppressed by the neutron absorbers of the thermostating modules—then act to heat the coolant to the temperature specified by the design set-point of their modules, provided that the nuclear fission fuel temperature does not become excessive (and regardless of the temperature at which the coolant arrived in the core). The two coolant flows then move through the two sections of already-burned fuel centerward of the two burnfronts, removing residual nuclear fission and afterheat thermal power from them, both exiting the fuel-charge at its center. This arrangement encourages the propagation of the two burnfronts toward the two ends of the fuel-charge by "trimming" excess neutrons primarily from the trailing edge of each front, as illustrated in FIGS. 1E-1H.

Thus, the core's neutronics may be considered to be substantially self-regulated. For example, for cylindrical core embodiments, the core's nucleonics may be considered to be substantially self-regulating when the fuel density-radius product of the cylindrical core is $\geq 200$ gm/cm² (that is, 1-2 mean free paths for neutron-induced fission in a core of typical composition, for a reasonably fast neutron spectrum). One function of the neutron reflector in such core designs is to substantially reduce the fast neutron fluence seen by the outer portions of the reactor, such as its radiation shield, structural supports, thermostating modules and outermost shell. Its incidental influence on the performance of the core is to improve the breeding efficiency and the specific power in the outermost portions of the fuel, though the value of this is primarily an enhancement of the reactor's economic efficiency. Outlying portions of the fuel-charge are not used at low overall energetic efficiency, but have isotopic burn-up levels comparable to those at the center of the fuel-charge.

Final, irreversible negation of the core's neutronic reactivity may be performed at any time by injection of neutronic poison into the coolant stream, via either the primary loops which extend to the application heat exchangers 16 (FIG. 1A) or the afterheat-dumping loops connecting the nuclear fission reactor 10 (FIG. 1A) to the heat dump heat exchangers 26 (FIG. 1A). For example, lightly loading the coolant stream with a material such as $BF_3$, possibly accompanied by a volatile reducing agent such as $H_2$ if desired, may deposit metallic boron substantially uniformly over the inner walls of the coolant-tubes threading through the reactor's core, via exponential acceleration of the otherwise slow chemical reaction $2BF_3 + 3H_2 \rightarrow 2B + 6HF$ by the high temperatures found therein. Boron, in turn, is a highly refractory metalloid, and will not migrate from its site of deposition. Substantially uniform presence of boron in the core in <100 kg quantities may negate the core's neutronic reactivity for indefinitely prolonged intervals without involving the use of powered mechanisms in the vicinity of the reactor.

Illustrative Embodiments and Aspects of Nuclear Fission Igniters

Illustrative embodiments and aspects of the nuclear fission igniter 110 will now be discussed.

Referring now to FIGS. 2A-2J, non-limiting illustrative embodiments of the nuclear fission igniter 110 are shown as being installed in a non-limiting illustrative embodiment of the nuclear fission reactor core assembly 100 that is suitable for use with a fast neutron spectrum nuclear fission reactor, such as a nuclear fission deflagration wave reactor. To that end, the nuclear fission reactor core assembly 100 includes nuclear fission fuel material that is configured to propagate a nuclear fission deflagration wave therein and can be referred to as a nuclear fission deflagration wave reactor core assembly 100.

The nuclear fission deflagration wave reactor core assembly 100 defines coolant channels 112. In some embodiments, reactor coolant may be Helium gas. However, any suitable reactor coolant may be used in other embodiments as desired for a particular application.

The nuclear fission deflagration wave reactor core assembly 100 includes nuclear fuel material that includes fertile material, such as without limitation $^{238}$U and/or $^{232}$Th. The nuclear fission fuel material of the nuclear fission deflagration wave reactor core assembly 100 also includes fissile material, such as without limitation $^{233}$U, $^{235}$U, and/or $^{239}$Pu. Concentration of the nuclear fission fuel material in the nuclear fission deflagration wave reactor core assembly 100 can vary spatially as desired for a particular application.

It will be appreciated that the nuclear fission igniter 110 and the nuclear fission deflagration wave reactor core assembly 100 are shown schematically. As such, no geometric limitations are intended regarding shape of the nuclear fission igniter 110 or the nuclear fission deflagration wave reactor core assembly 100. As mentioned above, details were discussed for circular cylinders of natural uranium or thorium metal that may stably propagate nuclear fission deflagration waves for arbitrarily great axial distances. However, it is again emphasized that propagation of nuclear fission deflagration waves is not to be construed to be limited to circular cylinders or to metallic nuclear fission fuels, or to pure uranium or thorium nuclear fission fuel materials. Additional embodiments of the nuclear fission deflagration wave reactor core assembly 100 and fuel charges disposed therein can have any alternate geometries as desired for a particular application and are described in U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, AND LOWELL L. WOOD, JR. as inventors, filed 28 Nov. 2006, the entire contents of which are hereby incorporated by reference.

Non-limiting details of illustrative nuclear fission igniters 110 will now be described.

The nuclear fission igniter 110 suitably can launch a nuclear fission deflagration wave into the nuclear fission deflagration wave reactor core assembly 100. The nucleonics of launching and propagation of a nuclear fission deflagration wave in nuclear fission fuel material are described above and need not be repeated.

In an illustrative embodiment, the nuclear fission igniter 110 includes a portion of nuclear fission fuel material that is insertable in the nuclear fission deflagration wave reactor core assembly 100. The portion of nuclear fuel material has a $k_{effective}$ less than 1 when the nuclear fission igniter 110 is outside the nuclear fission deflagration wave reactor core assembly 100. The portion of nuclear fuel material is arranged to establish a $k_{effective}$ of at least 1 when the nuclear fission igniter 110 is installed in the nuclear fission deflagration wave reactor core assembly 100. Illustrative transport assemblies for transporting the nuclear fission igniter 110 outside the nuclear fission deflagration wave reactor core assembly 100 will be described further below.

The nuclear fuel material of the nuclear fission igniter 110 can include fissile material, such as without limitation $^{233}$U, $^{235}$U, and/or $^{239}$Pu. If desired, the nuclear fuel material of the nuclear fission igniter 110 can include fertile material in addition to the fissile material. Given by way of non-limiting example, the fertile material can include without limitation $^{238}$U and/or $^{232}$Th. Concentration of the fissile material in the nuclear fission fuel material of the nuclear fission igniter 110 may be greater than concentration of the fissile material in the nuclear fission fuel material of the nuclear fission deflagration wave reactor core assembly 100. Also, concentration of the nuclear fission fuel material of the nuclear fission igniter 110 can vary spatially as desired for a particular application.

Referring now to FIGS. 2A, 2C, 2E, 2G, and 2I, in some embodiments the nuclear fission igniter 110 may define channels 114. The channels 114 suitably may be defined about an exterior of the nuclear fission fuel material in some embodiments for ease of manufacturing. In some other embodiments the channels 114 can be defined within an interior of the nuclear fission igniter. The channels 114 are defined to align and mate with the coolant channels 112. When the nuclear fission igniter 110 is inserted into the nuclear fission deflagration wave reactor core assembly 100, the channels 114 are aligned with the coolant channels 114, thereby mating with the coolant channels 114. With the channels 114 aligned with the coolant channels 112, reactor coolant that is flowing through the coolant channels 112 can flow into and through the nuclear fission igniter 110 via the channels 114 and back into the coolant channels 112 after exiting the nuclear fission igniter 110. In other embodiments, the channels 114 do not align with the coolant channels 112.

It will be appreciated that the channels 114 are an optional feature of the nuclear fission igniter 110. To that end and referring now to FIGS. 2B, 2D, 2F, 2H, and 2J, in some embodiments the nuclear fission igniter 110 does not define any channels.

Referring back to FIGS. 2A-2J and as mentioned above, the nuclear fission fuel material of the nuclear fission igniter 110 has a $k_{effective}$ less than 1 when the nuclear fission igniter 110 is outside the nuclear fission deflagration wave reactor core assembly 100. To achieve a value of $k_{effective}$ less than 1 when the nuclear fission igniter 110 is outside the nuclear fission deflagration wave reactor core assembly 100, in some embodiments neutron absorbing material is provided. The neutron absorbing material may include any neutron absorbing material as desired for a particular application, such as without limitation $^{10}$B and/or $^{6}$Li.

In some embodiments, the neutron absorbing material is disposed in the nuclear fission fuel material of the nuclear fission igniter 110. In some other embodiments, the neutron absorbing material is disposed around an exterior of the nuclear fission fuel material of the nuclear fission igniter 110.

Figure 3A:
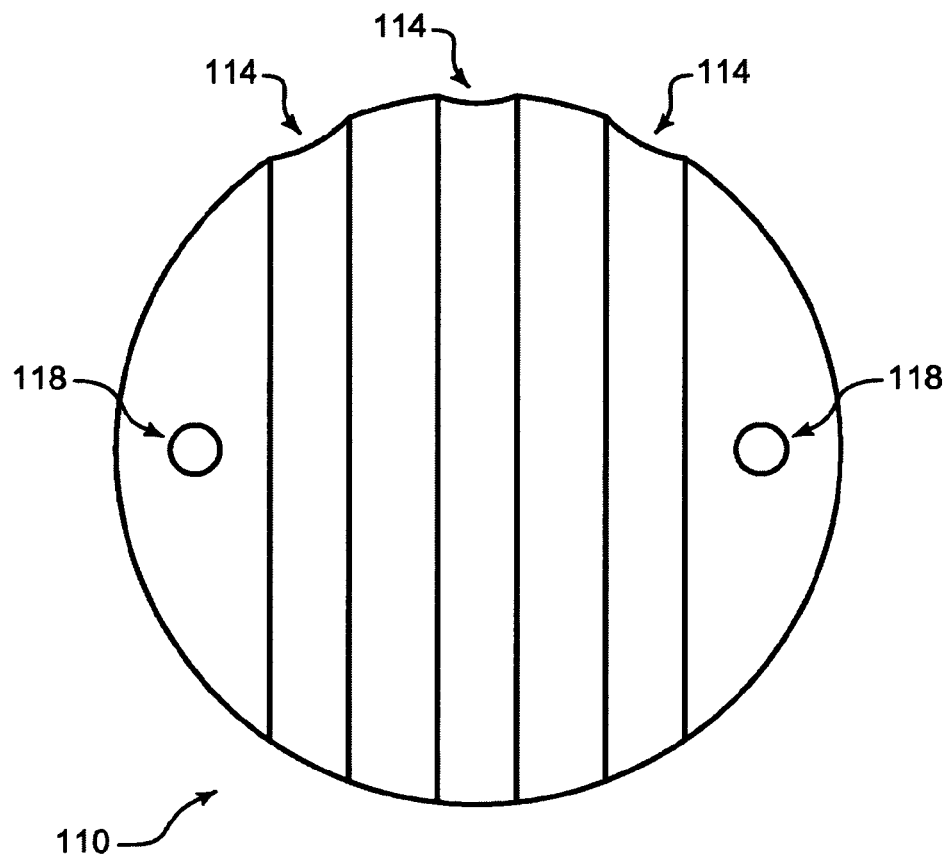
FIG. 3A is a plan view of an illustrative nuclear fission igniter.
Figure 3B:
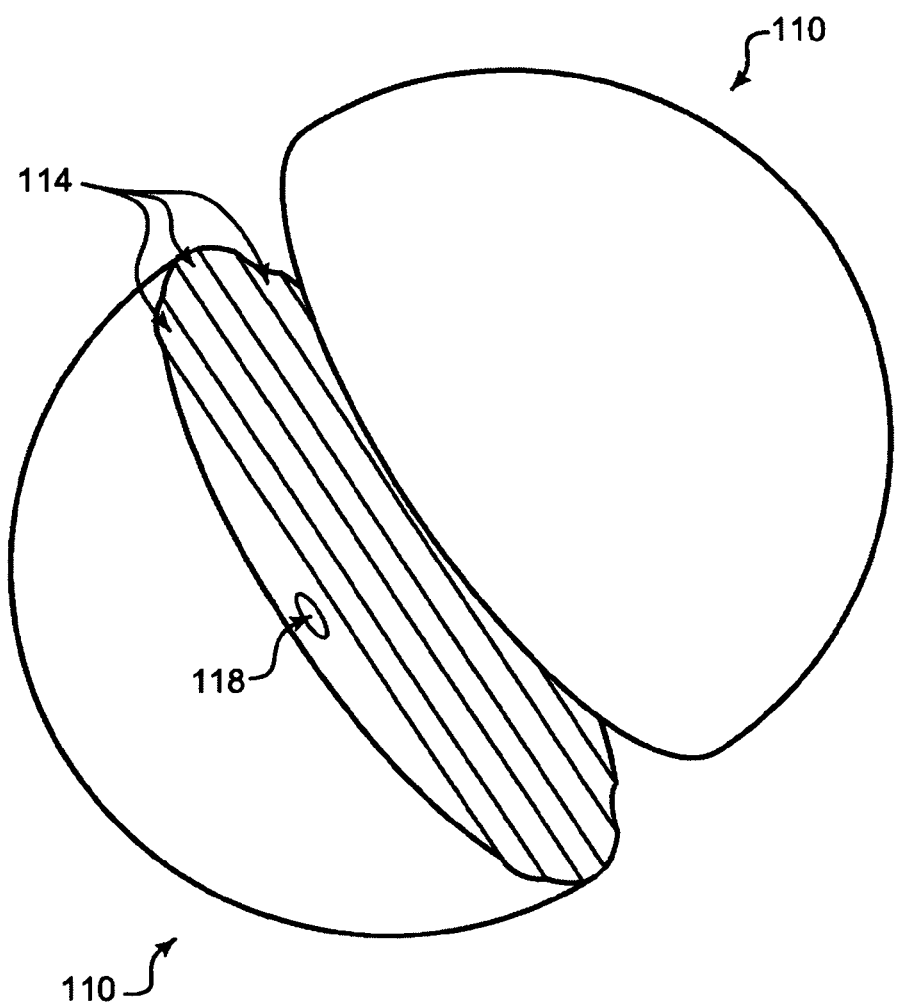
FIG. 3B is a perspective view of an illustrative nuclear fission igniter.

In some embodiments the neutron absorbing material is removable. Removal of the neutron absorbing material can help in establishing a $k_{effective}$ of at least 1 when the nuclear fission igniter 110 is installed in the nuclear fission deflagration wave reactor core assembly 100. Referring additionally to FIGS. 3A and 3B, the neutron absorbing material may be removed by any desired removal method, such as by operator-commanded electrical heating, pumping-out of a fluid from ports 118, shimming-out of control rods through the ports 118, or the like.

In some embodiments, other modalities may be employed as desired to help in establishing a $k_{effective}$ of at least 1 when the nuclear fission igniter 110 is installed in the nuclear fission deflagration wave reactor core assembly 100. These other modalities described below may be employed within the nuclear fission igniter 110, or within the nuclear fission deflagration wave reactor core assembly 100, or within both the nuclear fission igniter 110 and the nuclear fission deflagration wave reactor core assembly 100, as desired for a particular application. In some embodiments the modalities may be employed during startup only. That is, the material used in the modality may be added after the nuclear fission igniter 110 is installed in the nuclear fission deflagration wave reactor core assembly 100 for startup purposes and, if desired, may be removed after startup. The material used in the modality may be added and removed in any manner as desired. For example and without limitation, the material used in the modality may be added and removed as desired to and from the nuclear fission igniter 110 via the ports 118.

For example, in one other modality neutron moderating material may be provided within the nuclear fission igniter 110, or within the nuclear fission deflagration wave reactor core assembly 100, or within both the nuclear fission igniter 110 and the nuclear fission deflagration wave reactor core assembly 100, as desired for a particular application. Given by way of non-limiting example, the neutron moderating material may include heavy water, carbon, and/or $^7$Li.

In another modality neutron reflecting material may be provided within the nuclear fission igniter 110, or within the nuclear fission deflagration wave reactor core assembly 100, or within both the nuclear fission igniter 110 and the nuclear fission deflagration wave reactor core assembly 100, as desired for a particular application. Given by way of non-limiting example, the neutron reflecting material may include graphite and/or beryllium.

In another modality neutron multiplicative material may be provided within the nuclear fission igniter 110, or within the nuclear fission deflagration wave reactor core assembly 100, or within both the nuclear fission igniter 110 and the nuclear fission deflagration wave reactor core assembly 100, as desired for a particular application. Given by way of non-limiting example, the neutron multiplicative material may include $^9$Be and/or beryllides.

Figure 2A:
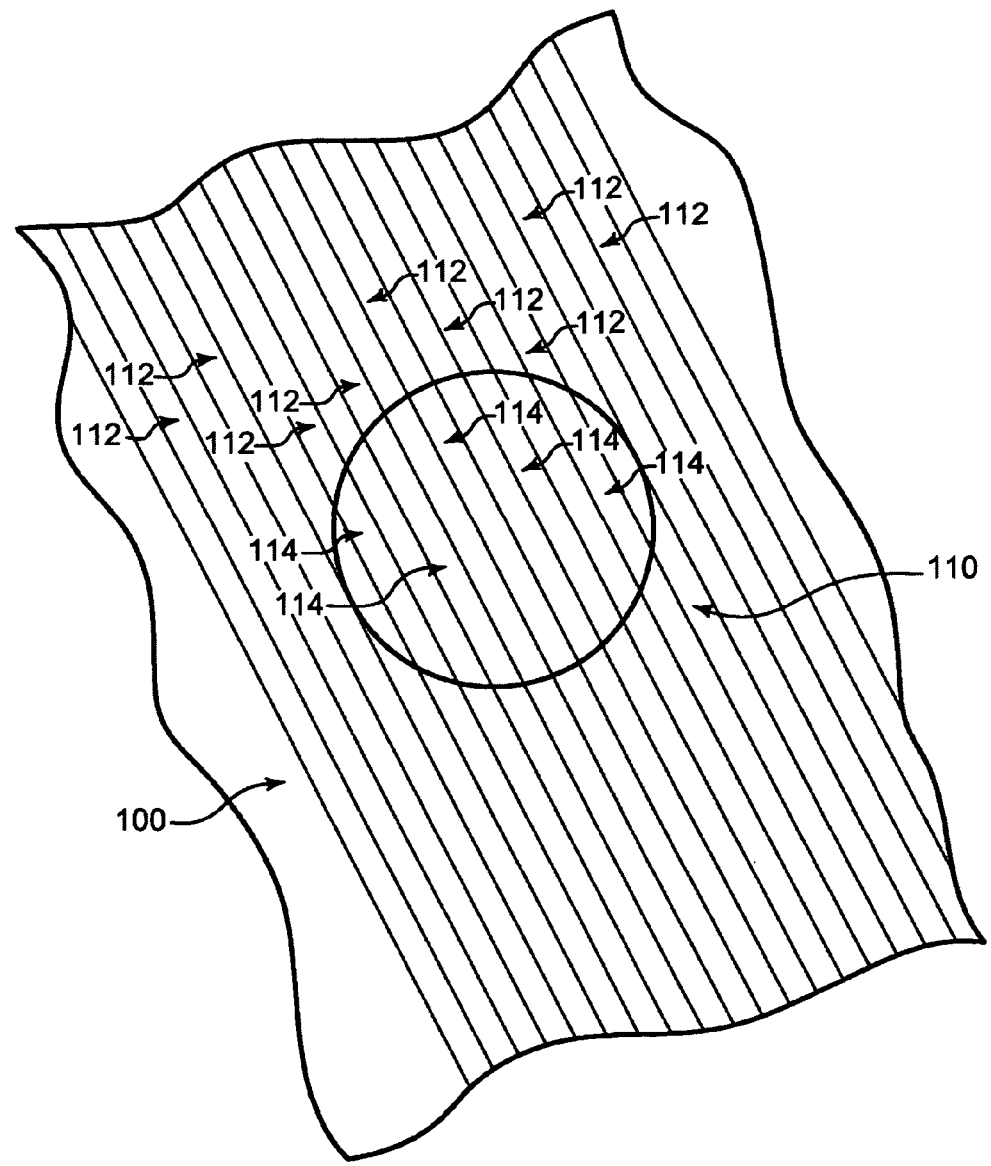
FIGS. 2A-2J are top plan views in schematic form of illustrative nuclear fission igniters installed in illustrative nuclear fission reactor core assemblies.
Figure 2B:
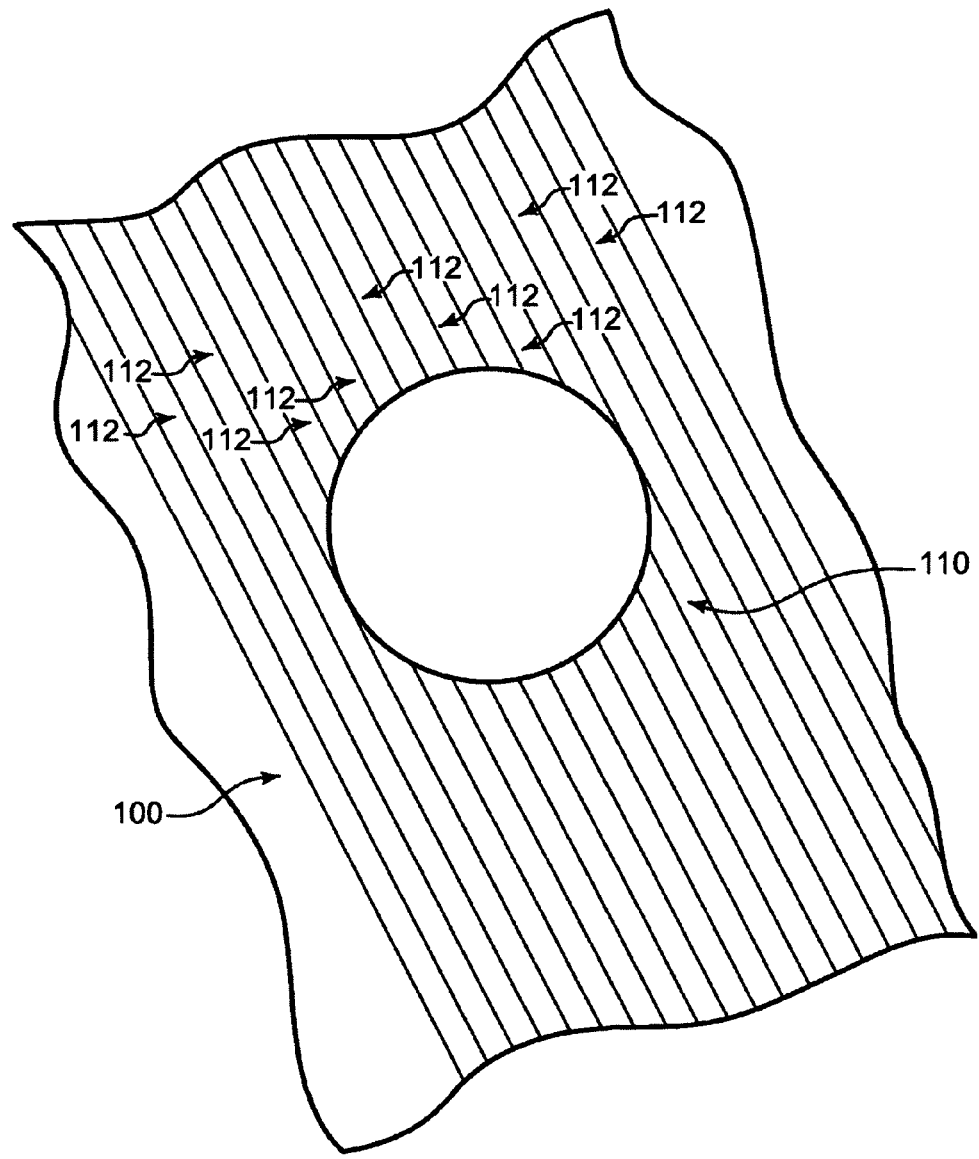
Figure 2C:
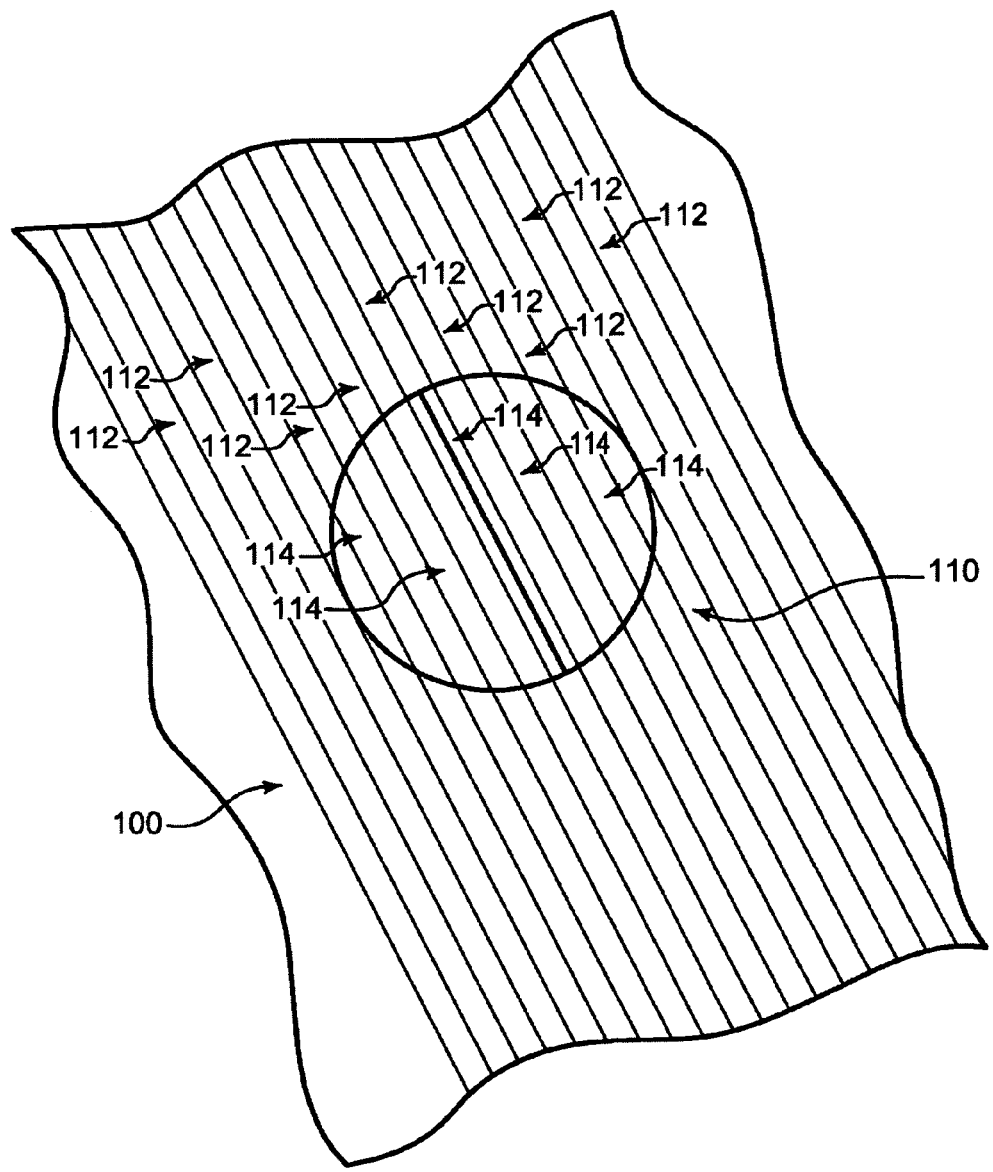
Figure 2D:
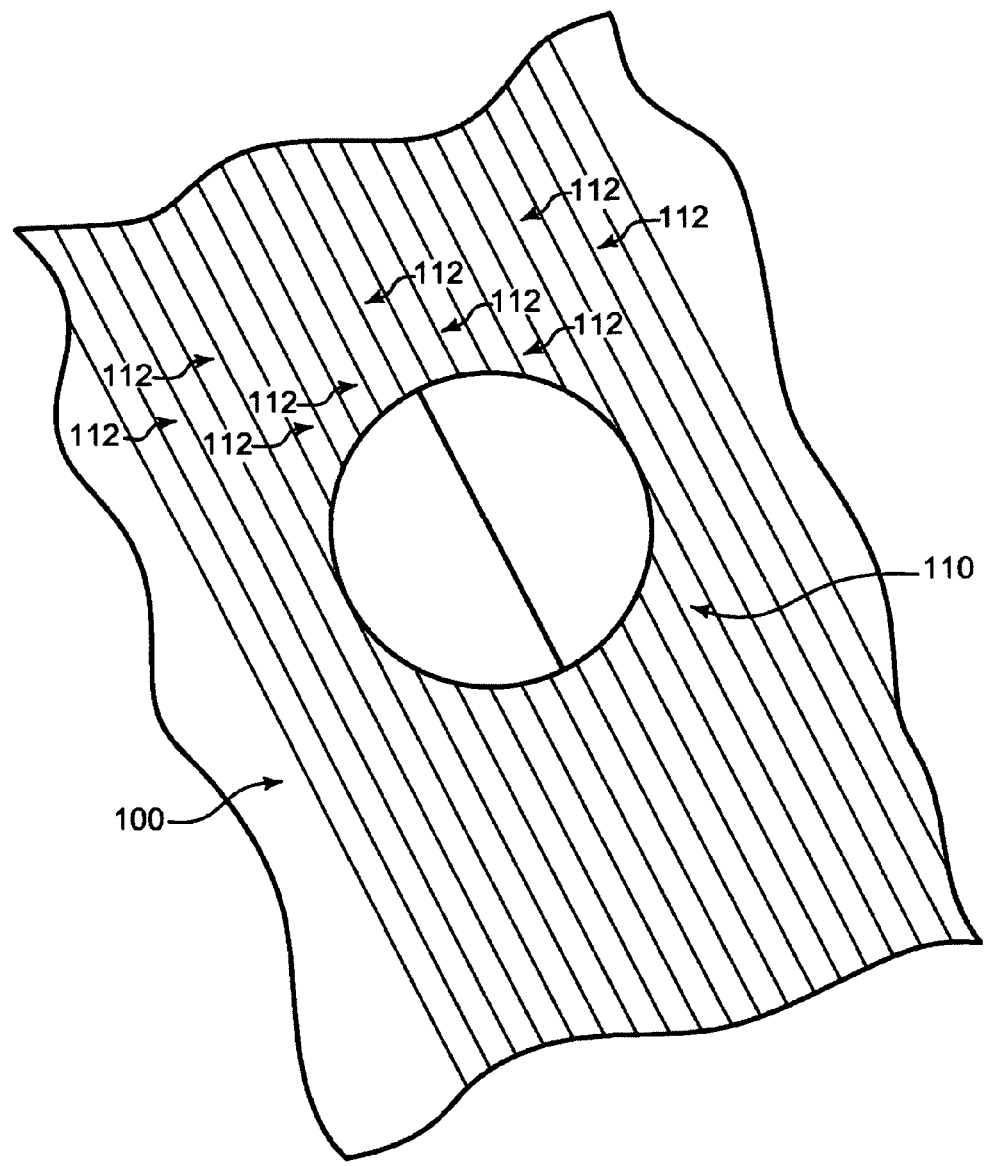
Figure 2E:
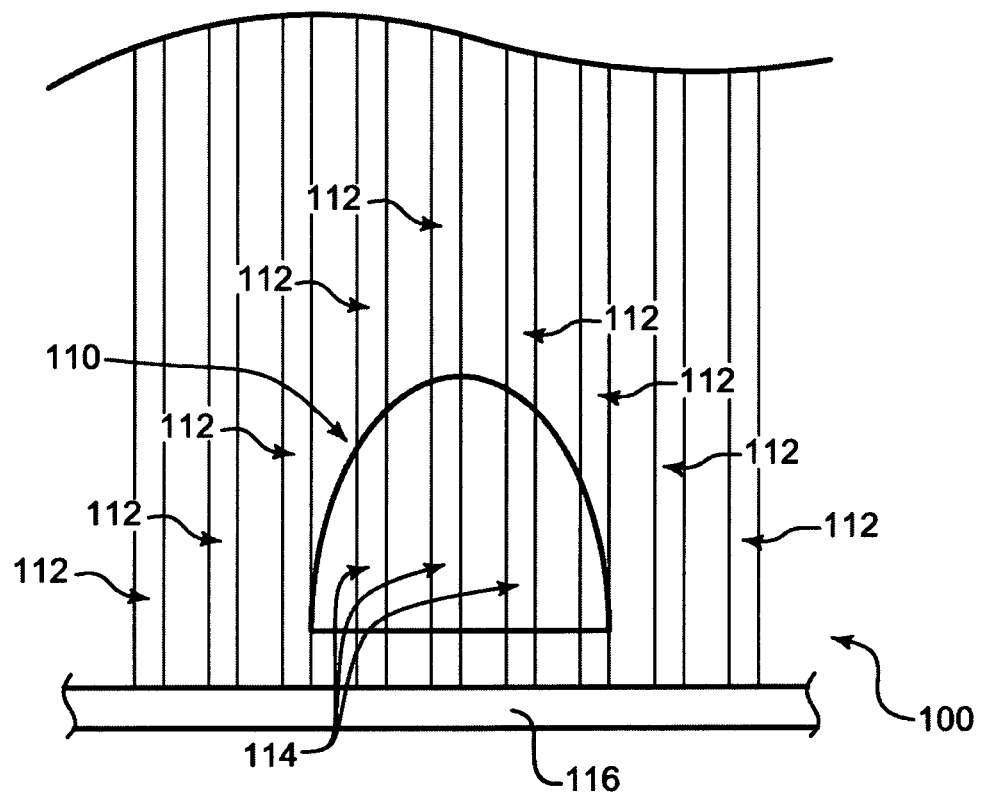
Figure 2F:
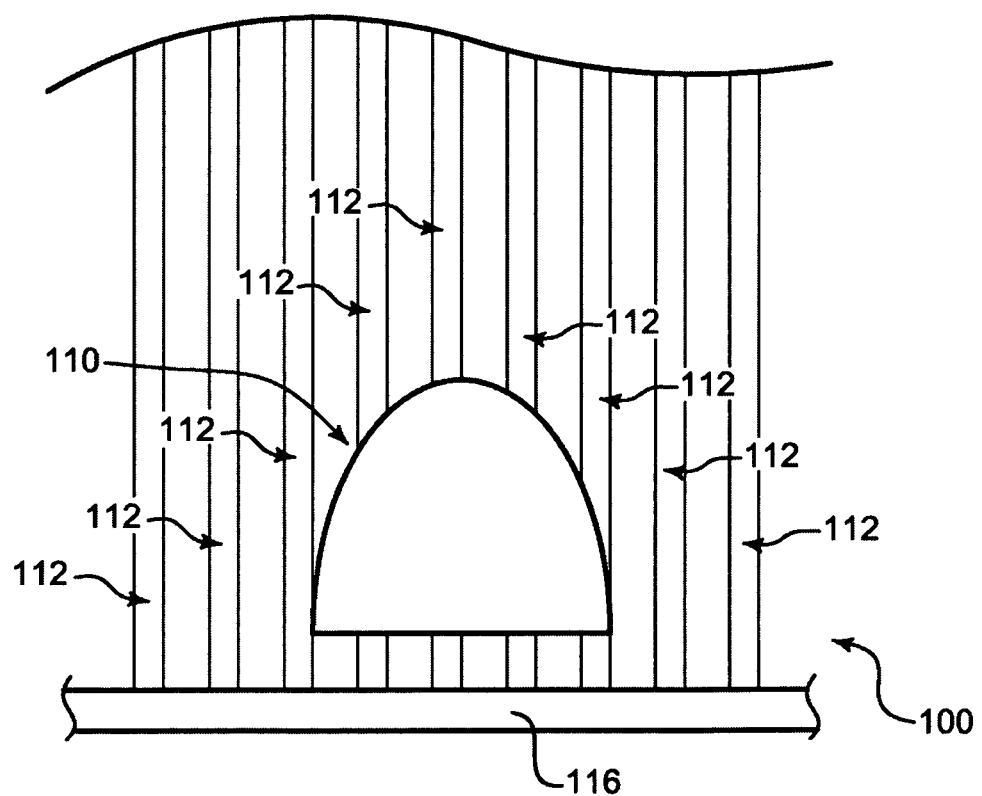
Figure 2G:
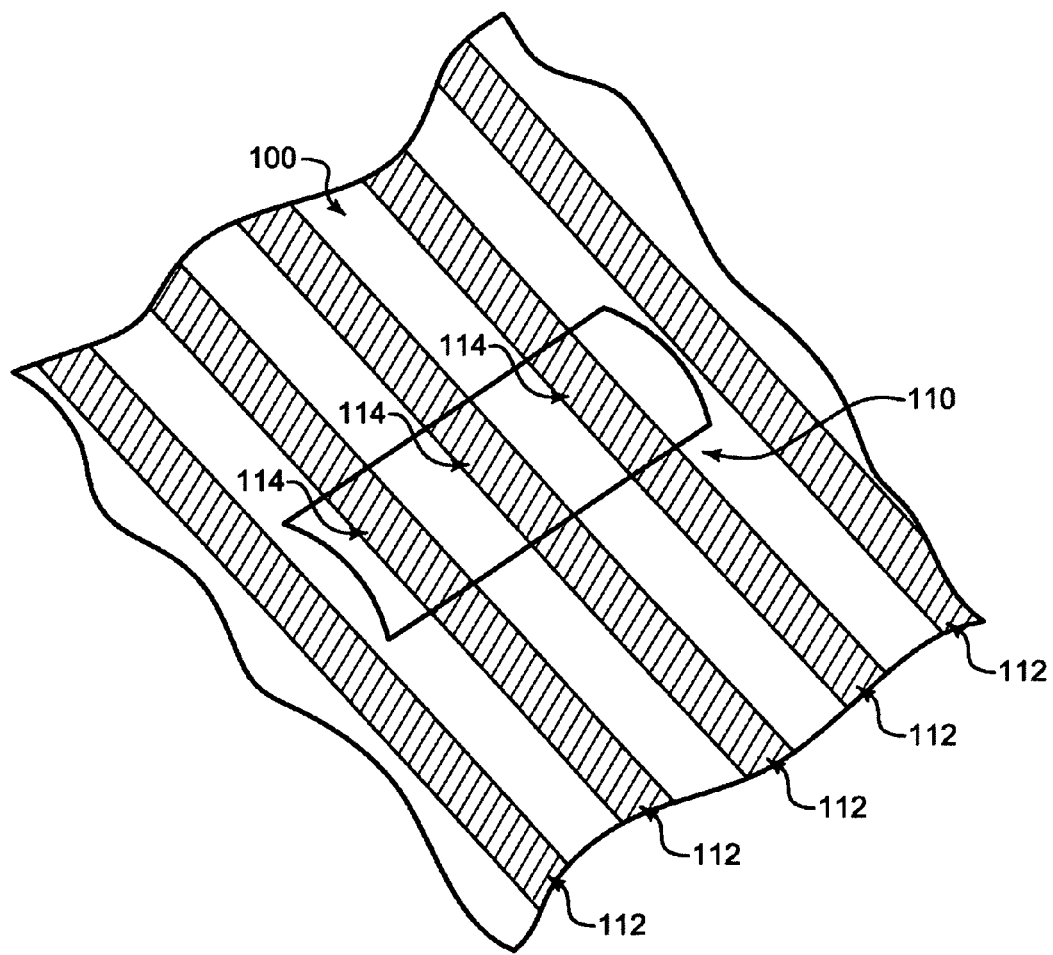
Figure 2H:
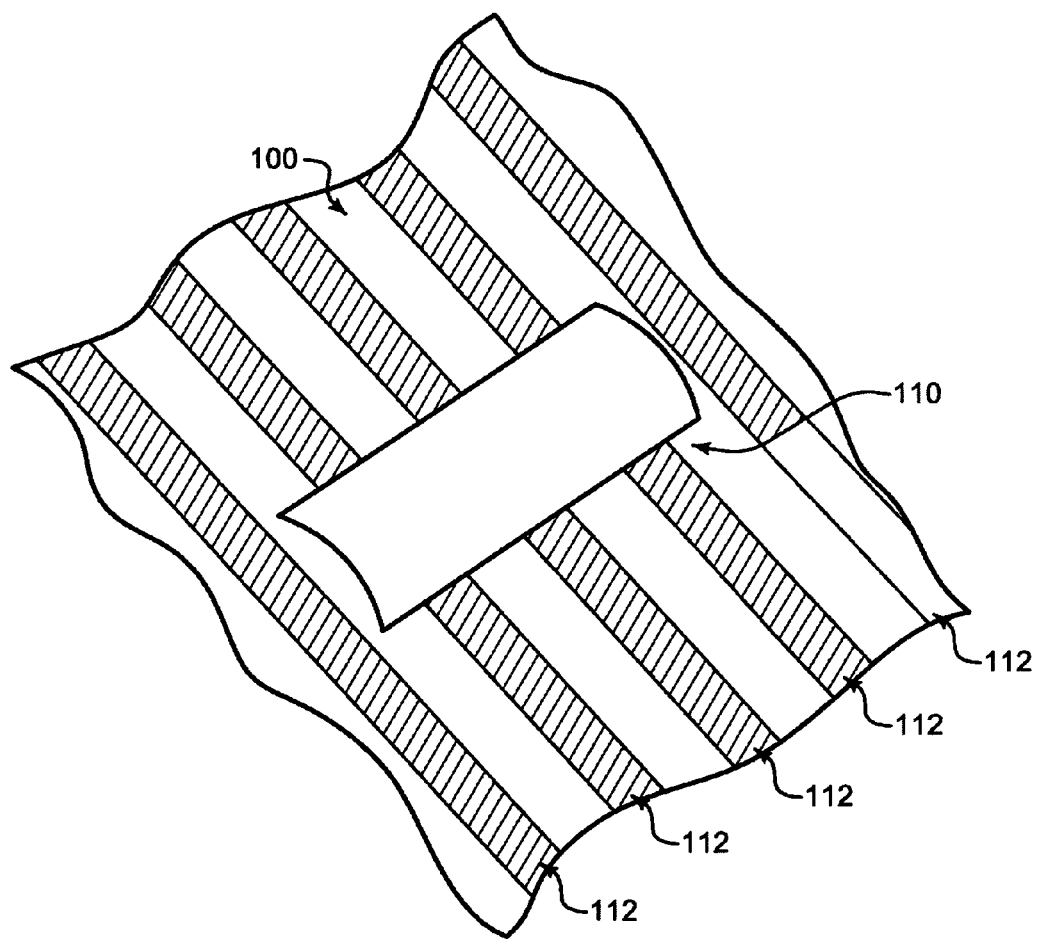
Figure 2I:
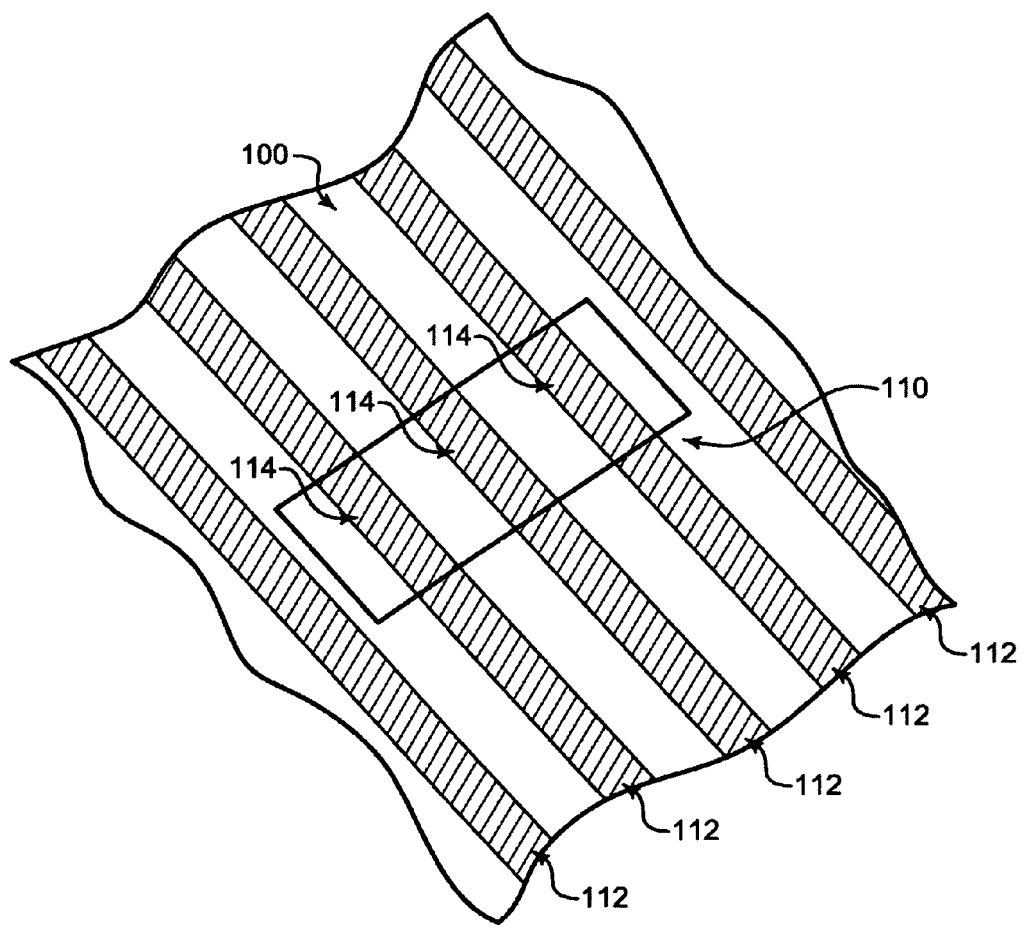
Figure 2J:
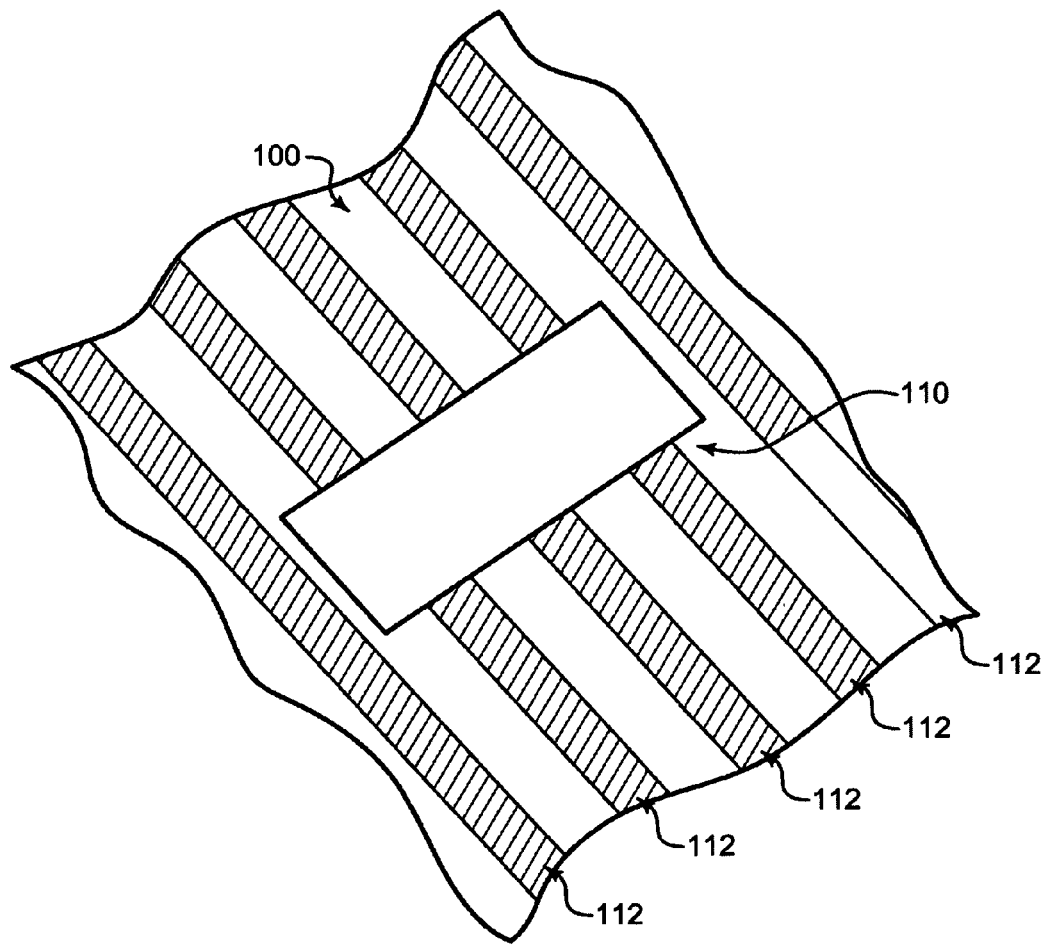

Embodiments of the nuclear fission igniter 110 may have any shape as desired. To that end, shape of the nuclear fission igniter 110 is not intended to be limited in any manner whatsoever. Given by way of example and not of limitation, illustrative nuclear fission igniters 110 are shown embodied as a sphere (FIGS. 2A and 2B), two hemispheres (FIGS. 2C and 2D), one hemisphere (FIGS. 2E and 2F), a cylinder (FIGS. 2G and 2H), and a rectangular parallelepiped (FIGS. 2I and 2J).

The nuclear fission igniter 110 may be placed in the nuclear fission deflagration wave reactor core assembly 100 at any location as desired for a particular application. Some embodiments of the nuclear fission igniter may also be well suited for placement near an end of the nuclear fission deflagration wave reactor core assembly 100 (for example, in the vicinity of a neutron reflector). For example and without limitation, in one contemplated application the hemispherical embodiment of the nuclear fission igniter 110 (FIGS. 2E and 2F) is shown near an end of the nuclear fission deflagration wave reactor core assembly 100 in the vicinity of a neutron reflector 116. However, in other contemplated applications the hemispherical embodiment of the nuclear fission igniter 110 may be placed away from an end (such as without limitation toward the center) of the nuclear fission deflagration wave reactor core assembly 100. Likewise, in other contemplated applications the illustrative nuclear fission igniters 110 embodied as a sphere (FIGS. 2A and 2B), two hemispheres (FIGS. 2C and 2D), a cylinder (FIGS. 2G and 2H), and a rectangular parallelepiped (FIGS. 2I and 2J) may be placed near an end of the nuclear fission deflagration wave reactor core assembly 100 (for example, in the vicinity of a neutron reflector). Thus, it will be understood that no limitation whatsoever is intended regarding placement of the nuclear fission igniter 110.

Regardless of the shape of the nuclear fission igniter 110, in some embodiments (such as when only one nuclear fission igniter 110 is installed in a nuclear fission deflagration wave reactor core assembly 100 to initiate a nuclear fission deflagration wave), the nuclear fission igniter 110 has at least one dimension of not substantially less than one mean free path for fission-inducing neutrons. Again regardless of the shape of the nuclear fission igniter 110 and in some other embodiments (such as when more than one of the nuclear fission igniters 110 are installed in a nuclear fission deflagration wave reactor core assembly 100 to initiate a nuclear fission deflagration wave), all of the nuclear fission igniters 110 may have dimensions less than one mean free path for fission-inducing neutrons. However, all of the nuclear fission igniters 110 are combined such that a combination of the nuclear fission igniters 110 has at least one dimension of not substantially less than one mean free path for fission-inducing neutrons.

Illustrative Transport Assemblies for Nuclear Fission Igniters

Referring now to FIGS. 4A-4E, the nuclear fission igniter 110 can be transported as desired in a transport assembly 120. Illustrative embodiments of the transport assembly 120 are configured to receive one or more of any type of nuclear fission igniter 110 for transport, such as transport to one or more nuclear fission deflagration wave reactors 100. For the sake of brevity, the transport assembly 120 is illustrated for explanatory purposes only as having a shape to accommodate a hemispherical-shaped nuclear fission igniter. However, it will be understood that the transport assembly 120 may have any shape whatsoever as desired to accommodate any shape of a nuclear fission igniter 110 that is to be transported. Thus, shape of the transport assembly 120 is not intended to be limited in any manner whatsoever. Illustrative embodiments of the transport assembly 120 will be described below.

The transport assembly 120 includes a housing body 122 that is arranged to receive nuclear shielding material 124. In some embodiments, the nuclear shielding material 124 may be added or removed as desired for a particular application. The nuclear shielding material 124 suitably includes high-Z material, such as without limitation tungsten and/or tantalum. In some embodiments, the nuclear shielding material 124 suitably includes neutron absorbing material. In some other embodiments, the nuclear shielding material 124 suitably includes radiation absorbing material that is configured to shield $\alpha$, $\beta$, and/or $\gamma$ radiation. In some other embodiments, the nuclear shielding material 124 suitably includes neutron reflecting material, such as without limitation graphite and/or beryllium.

Figure 4A:
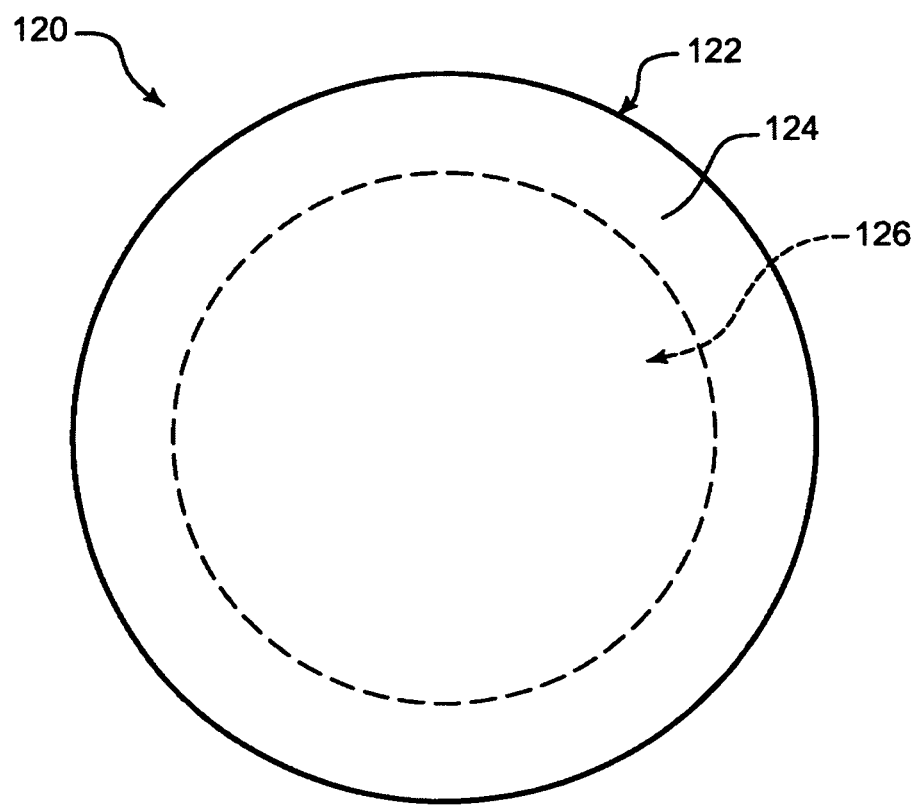
FIGS. 4A-4C are plan views in partial cutaway of illustrative transport assemblies for nuclear fission igniters.
Figure 4B:
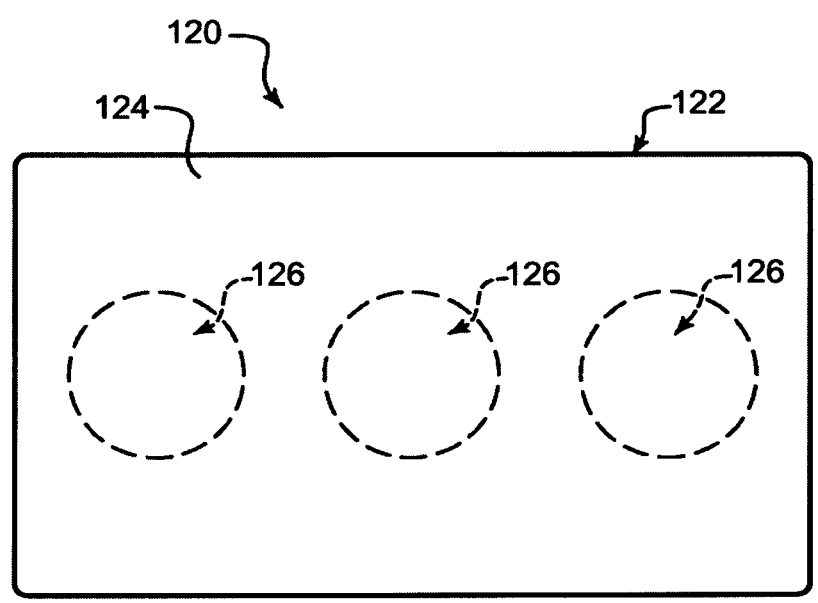

The housing body 122 defines at least one cavity 126 that is arranged to receive therein at least one of the nuclear fission igniters 110. In some embodiments and as shown in FIG. 4A, the housing body 122 defines one cavity 126 that is arranged to receive therein one nuclear fission igniter 110. In some other embodiments and as shown in FIG. 4B, the housing body 122 defines cavities 126 that are arranged to receive therein at least one nuclear fission igniter 110. The cavities 126 are spaced apart sufficiently (to help avoid critical mass geometry) and nuclear shielding material 124 is interposed between the cavities 126 to help maintain less than one the value of $k_{effective}$ of the nuclear fission igniters 110 received in the transport assembly 120.

At least one access port 128 is configured to define at least one opening in the housing body 122 such that at least one nuclear fission igniter 110 is receivable through the access port 128. The access port 128 may be further configured to close the opening in the housing body, thereby retaining the nuclear fission igniter 110 in the housing body 122.

Figure 4C:
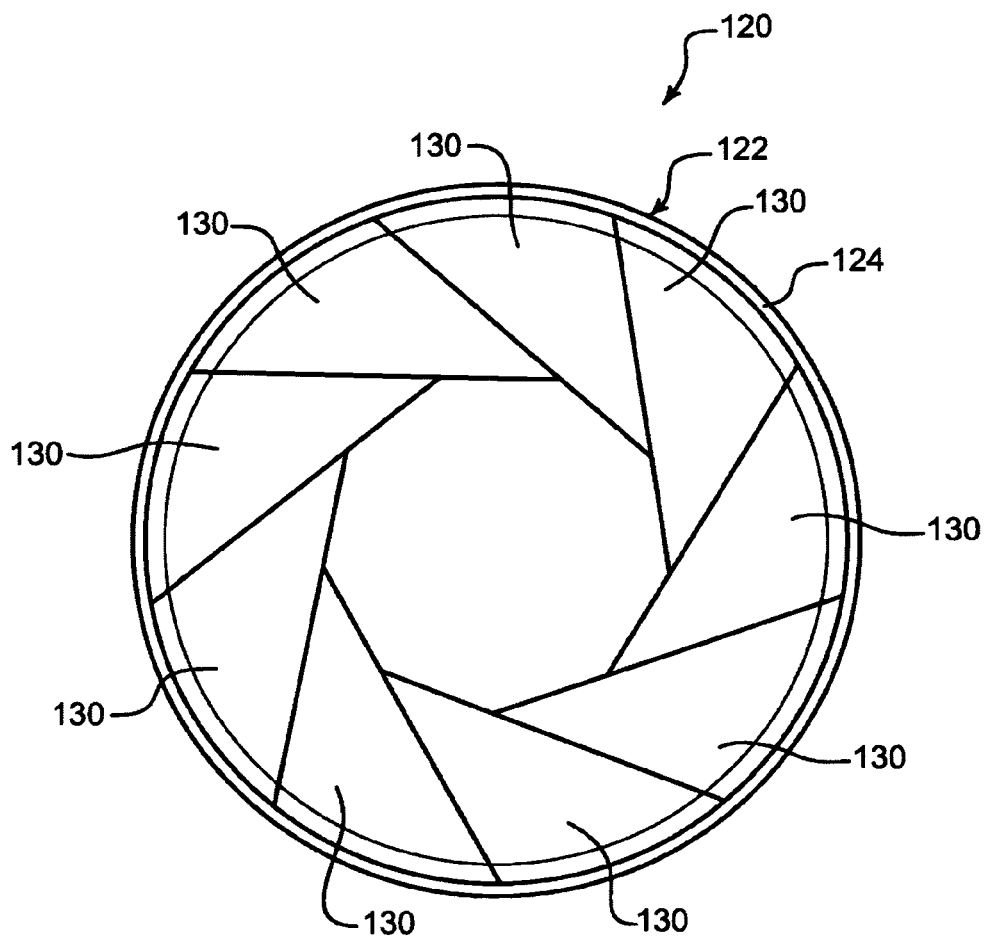

In some embodiments and as shown in FIG. 4C, the access port 128 can include shutters 130 defined in the housing body to open for receiving the nuclear fission igniter therethrough and to close for retaining the nuclear fission igniter 110 in the housing body 122.

Figure 4D:
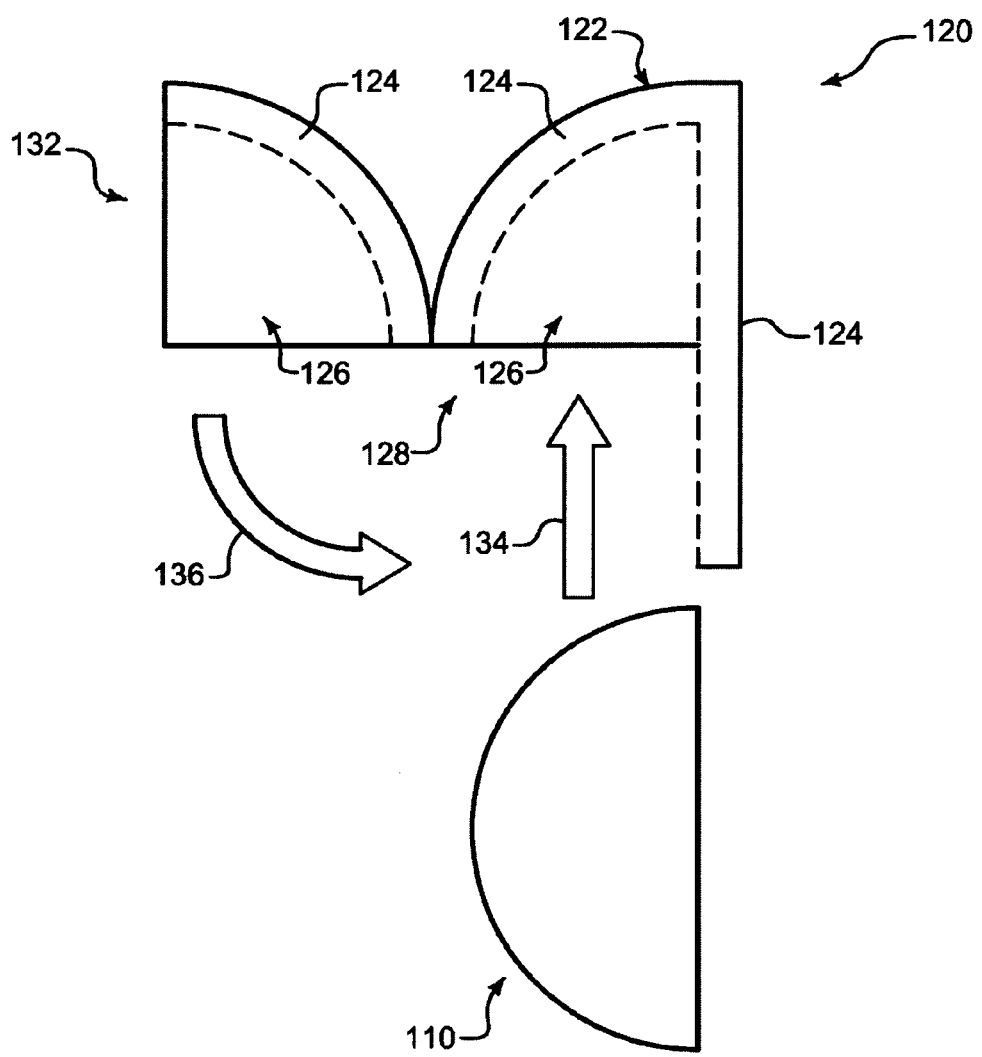
FIG. 4D illustrates insertion of an illustrative nuclear fission igniter into an illustrative housing.
Figure 4E:
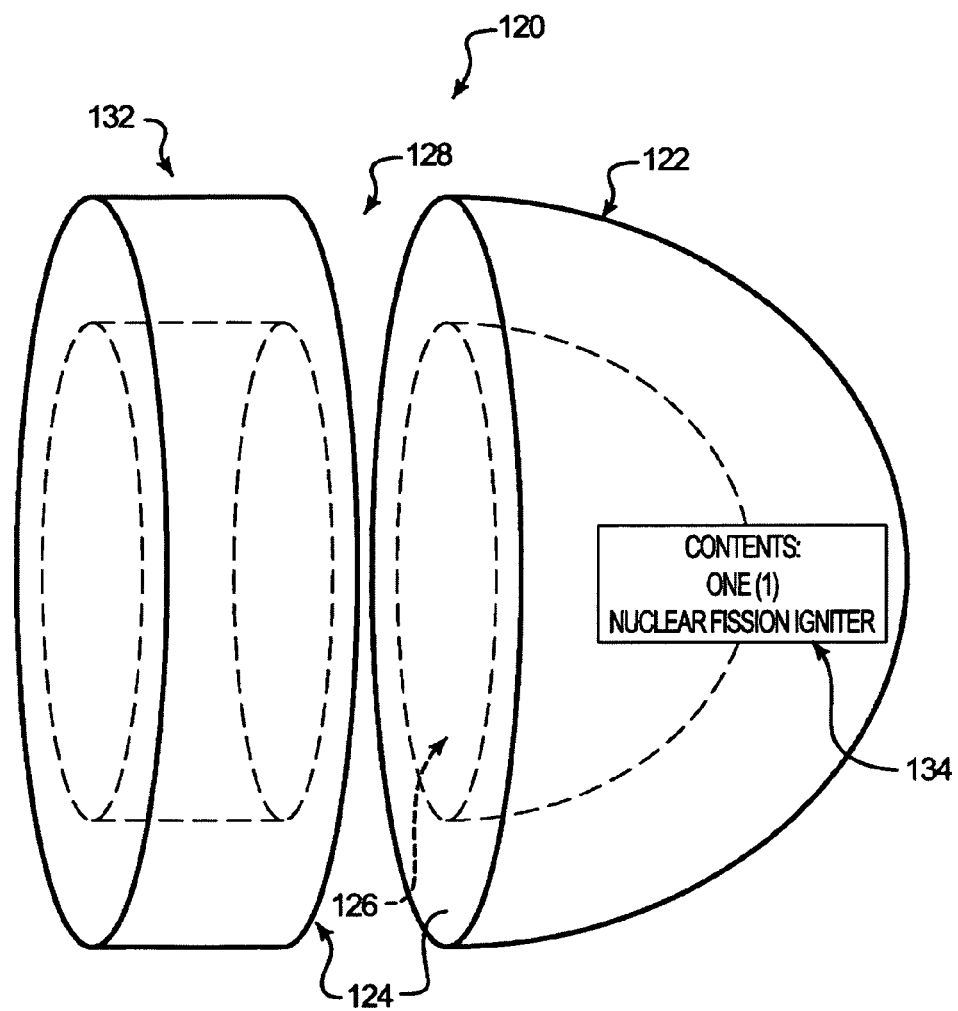
FIG. 4E is a perspective view in partial cutaway of another illustrative transport assembly for a nuclear fission igniter.

In some other embodiments and as shown in FIGS. 4D and 4E, the access port 128 can include a body cap 132. The body cap 132 suitably includes the nuclear shielding material 124 as described above.

In some embodiments that include the body cap 132 and as shown in FIG. 4D, the body cap 132 may be hingedly attached to the housing body 122. The body cap 132 is fully swung open, the nuclear fission igniter 110 is inserted into the cavity 126 as indicated by an arrow 134, and the body cap 132 is fully shut as indicated by an arrow 136. The nuclear fission igniter 110 is thus fully received in and shielded by the transport assembly 120.

In some other embodiments that include the body cap 132 and as shown in FIG. 4E, the body cap 132 may be removably attached to the housing body 122. The body cap 132 may be attached in any manner whatsoever as desired.

In some embodiments and as shown in FIG. 4E, at least one indicator 134 can be disposed on the transport assembly 120 as desired, such as on the housing body 122 or on the body cap 132. The indicator 134 suitably is configured to indicate contents of the transport assembly 120 (such as one or more of the nuclear fission igniters 110). Indication of contents can be made in any manner whatsoever as desired.

Illustrative Decay Heat Removal

Referring now to FIGS. 5A-5E, in some embodiments the nuclear fission igniter 110 may include nuclear fission fuel material that includes at least some components that have previously undergone neutron-mediated nuclear fission (also referred to herein as having been previously "burnt"). When the nuclear fission igniter 110 includes nuclear fission fuel material that includes at least some components that have been previously burnt, for a certain time period after it was operated at power the nuclear fission igniter 110 will produce decay heat. Depending upon how long a time period has transpired after shutdown of the power operation to which the nuclear fission fuel material of the nuclear fission igniter 110 was subjected, it may be desirable to remove decay heat from the nuclear fission igniter 110 during transport of the nuclear fission igniter 110. To that end, illustrative decay heat removal during transport of the nuclear fission igniter 110 will be discussed below.

At least one decay heat removal device 136 is provided for removal of decay heat from the nuclear fuel material of the nuclear fission igniter 110. The decay heat removal device 136 is placed in thermal communication with the nuclear fission igniter 110 such that decay heat generated by the nuclear fission igniter 110 can be transferred from the nuclear fission igniter 110 to the decay heat removal device 136.

Figure 5A:
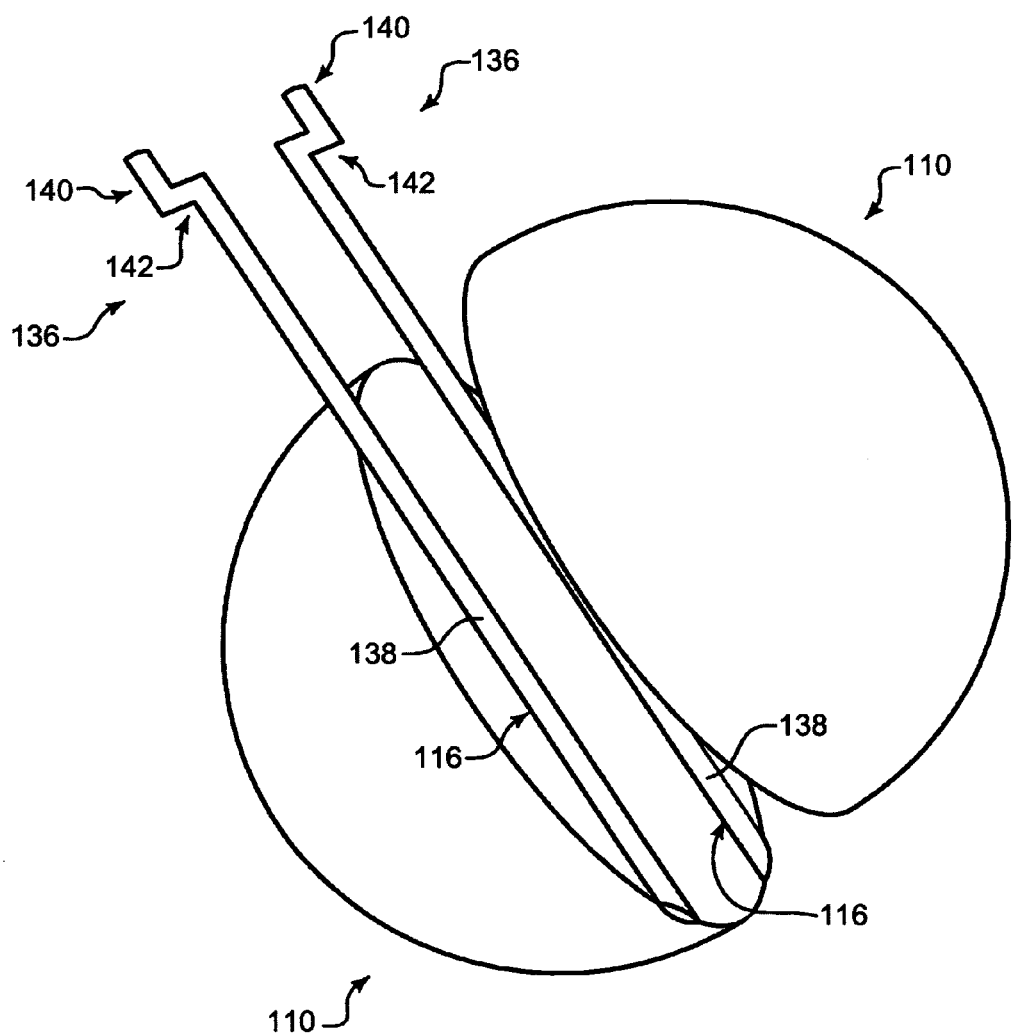
FIG. 5A is a perspective view of an illustrative nuclear fission igniter with a decay heat removal device.
Figure 5B:
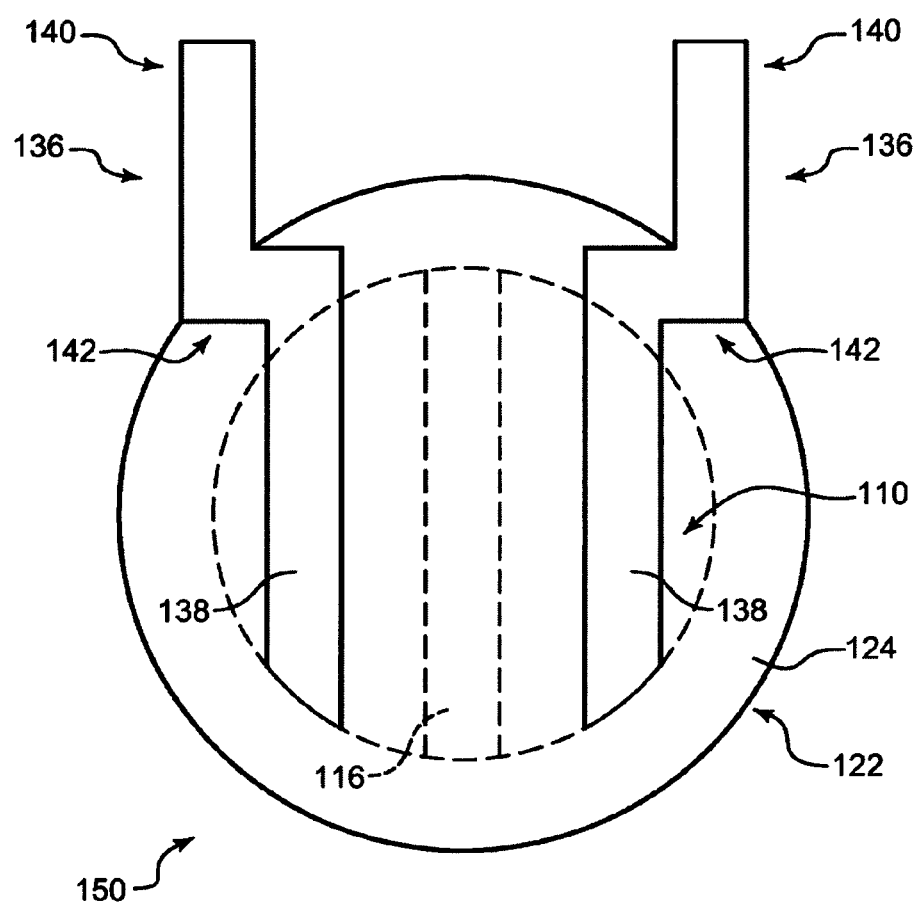
FIG. 5B is a plan view in partial cutaway of an illustrative nuclear fission igniter with an illustrative decay heat removal device in an illustrative transport assembly.

In one embodiment and referring to FIGS. 5A and 5B, the decay heat removal device 136 can include a heat pipe. A tube section 138 is placed in thermal communication with the nuclear fission igniter 110. In some embodiments, the tube section 138 is held in place in the channels 116, such as without limitation by friction fit. A heat sink section 140 is placed in thermal communication with an environment at a heat sink temperature, thereby helping permit temperature of the tube section 138 that is placed in thermal communication with the nuclear fission igniter 110 to equalize with the heat sink temperature. A "dog-leg" section 142 is interposed between the tube section 138 and the heat sink section 140. Any working fluid can be used as desired for a particular application, depending upon temperature conditions. For example and without limitation, the working fluid can include water, lithium, sodium, mercury, or the like. A capillary structure (not shown for purposes of clarity) such as a wick can be made of any suitable porous material, such as without limitation metal foams or felts made from steel, aluminum, nickel, copper, or the like.

Figure 5C:
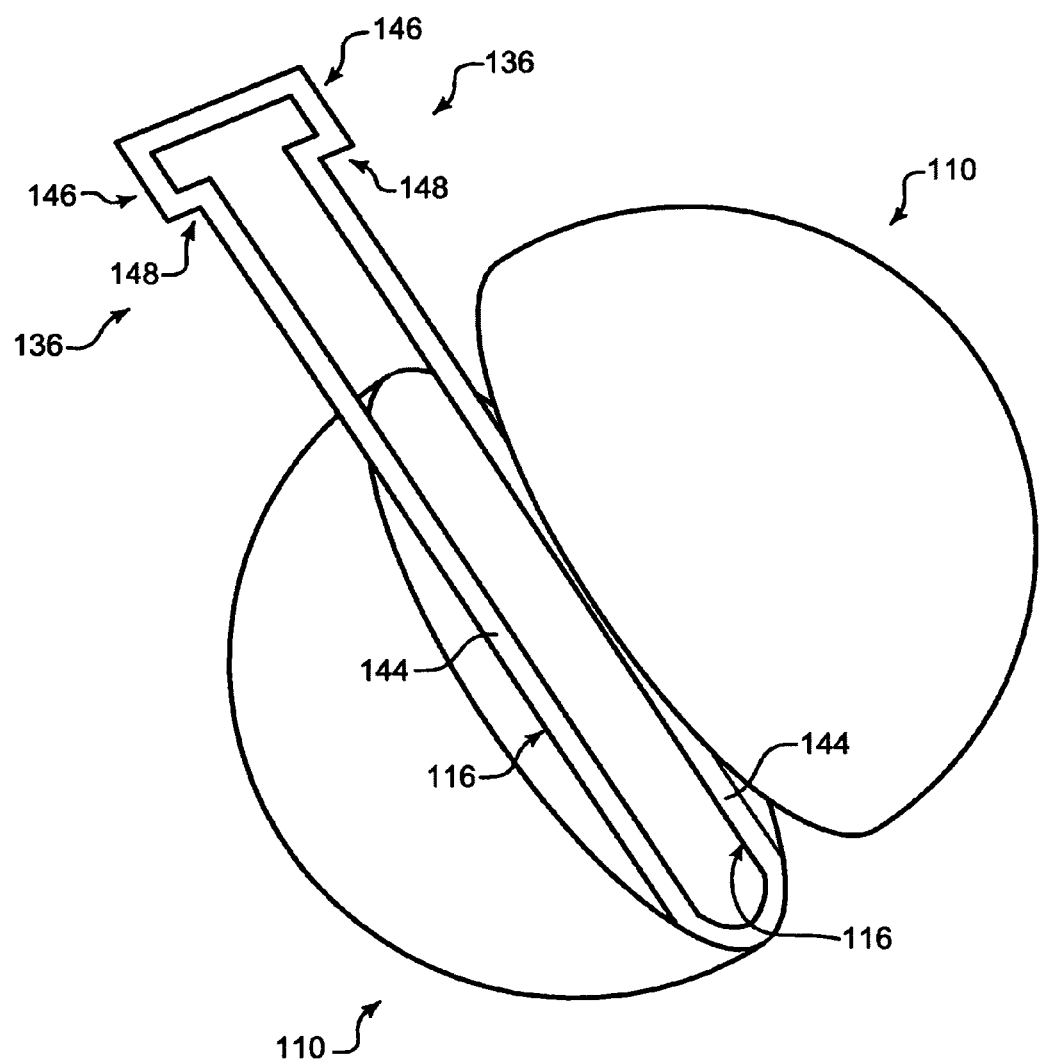
FIG. 5C is a perspective view in partial cutaway of an illustrative nuclear fission igniter with another illustrative decay heat removal device.

In another embodiment referring now to FIG. 5C, the decay heat removal device 136 can include a coolant loop. A tube section 144 is placed in thermal communication with the nuclear fission igniter 110. In some embodiments, the tube section 144 is held in place in the channels 116, such as without limitation by friction fit. A heat sink section 146 is placed in thermal communication with an environment at a heat sink temperature. Heat is transferred from the nuclear fission igniter 110 to coolant in the tube section 144, which in some embodiments rises via natural circulation to the heat sink section 146 where heat is transferred from the coolant to the environment at the heat sink temperature. After heat transfer to the environment at the heat sink temperature, in some embodiments the coolant returns via natural circulation to the tube section 144. In some other embodiments, the coolant is pumped with a suitable coolant pump (not shown) instead of being circulated via natural circulation. A "dog-leg" section 148 is interposed between the tube section 144 and the heat sink section 146. Any suitable fluid can be used as desired for a particular application, depending upon temperature conditions. For example and without limitation, the coolant can include water or the like.

Figure 5D:
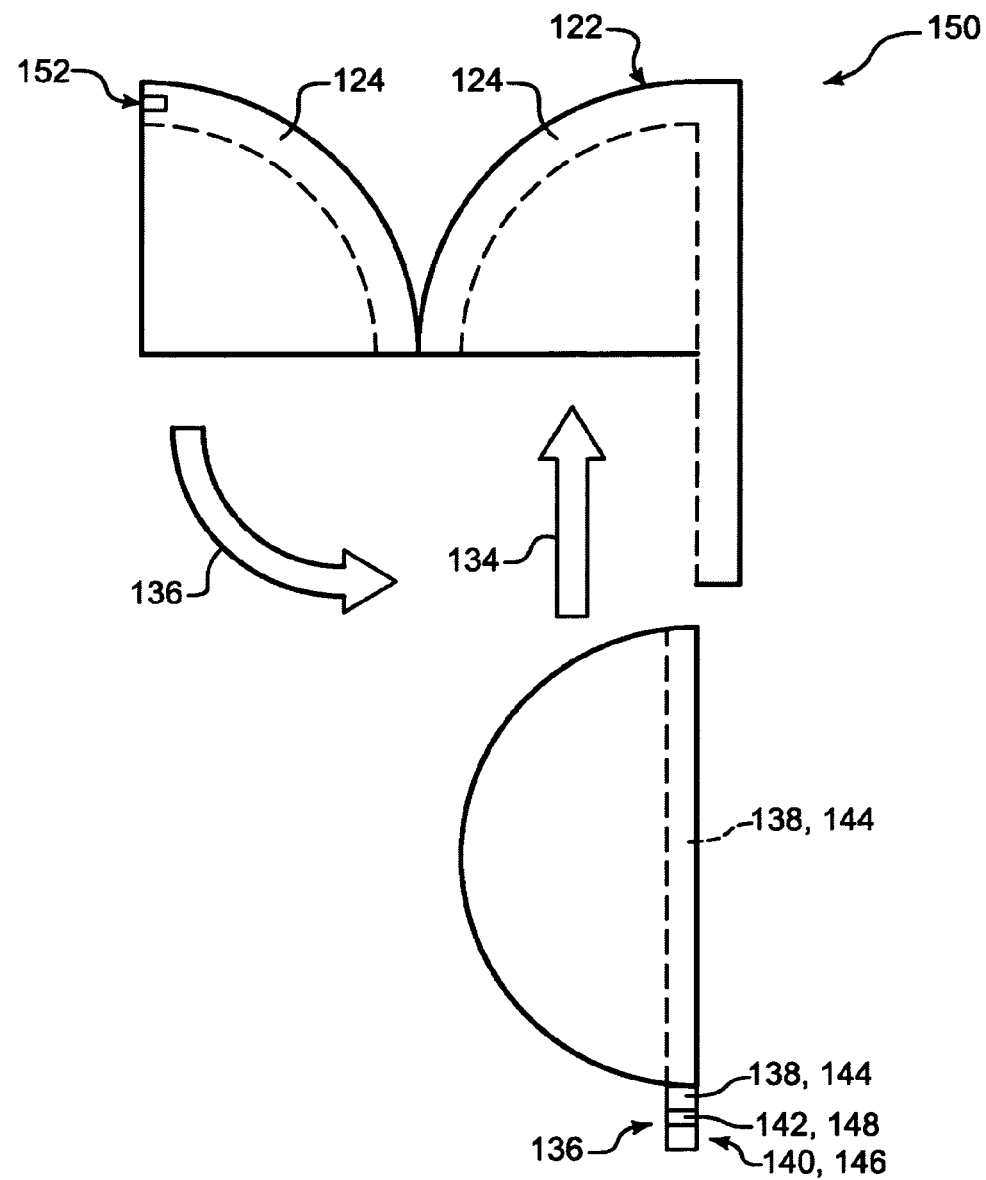
FIG. 5D illustrates insertion of an illustrative nuclear fission igniter with a decay heat removal device into an illustrative transport assembly.
Figure 5E:
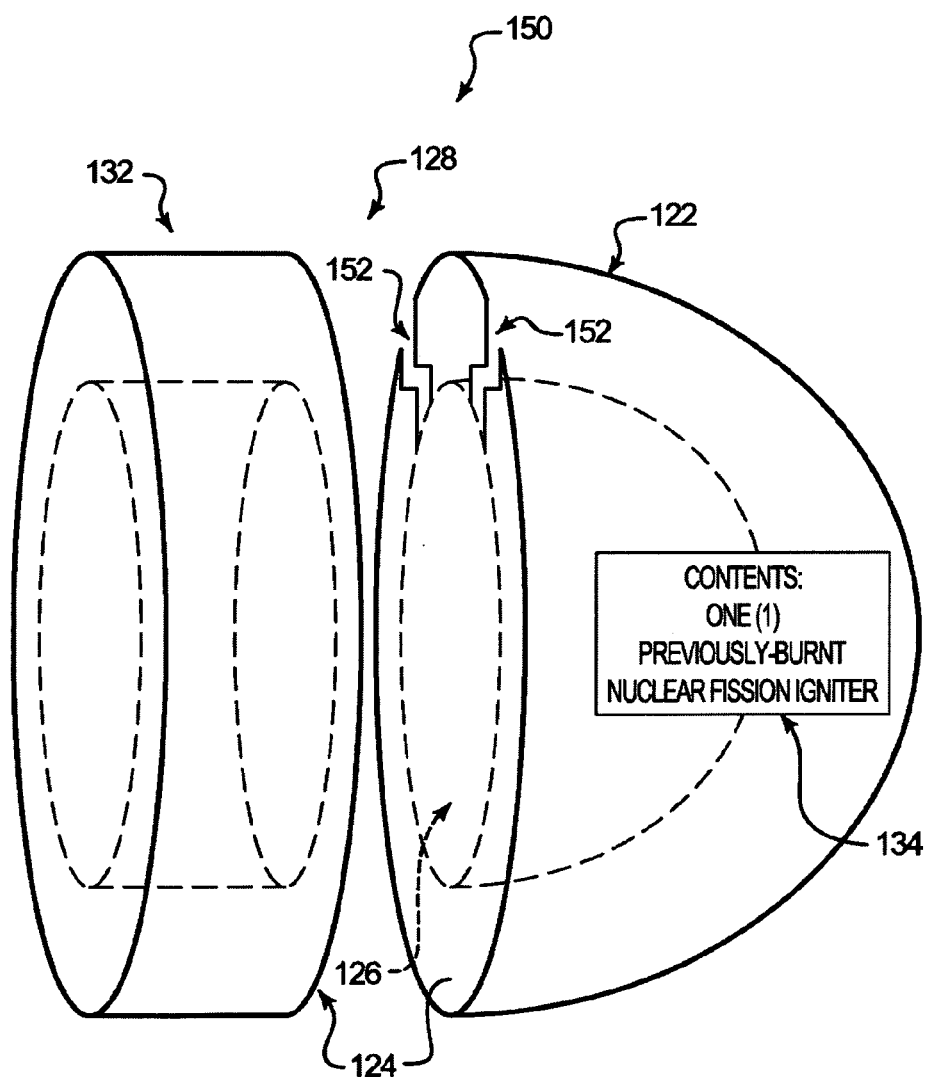
FIG. 5E is a perspective view in partial cutaway of another illustrative transport assembly with a decay heat removal passage.

Referring now to FIGS. 5D-5E, after the decay heat removal device 136 has been placed in thermal communication with the nuclear fission igniter 110, the nuclear fission igniter 110 and the decay heat removal device 136 can be placed in a transport assembly 150 for transport, such as transport to one or more nuclear fission deflagration wave reactor core assemblies (not shown). An illustrative embodiment of the transport assembly 150 shares many components in common with the transport assembly 120 (FIGS. 4A-4E). Like reference numbers are used to refer to like components, and details need not be repeated.

A decay heat removal passage 152 is defined in the housing body 122 between a port defined in an interior of the housing body 122 and a port defined in an exterior of the housing body 122. The decay heat removal passage 152 is located and sized to receive therein, such as without limitation by friction fit, the dog-leg section 142 (FIGS. 5A and 5B) or the dog-leg section 148 (FIG. 5C). The decay heat removal passage 152 thus laterally and longitudinally spaces apart openings in the interior of the housing body 122 and openings in the exterior of the housing body 122. As a result, the decay heat removal passage 152 is shaped to mitigate a straight line path for decay products from the interior of the housing body 122 to the exterior of the housing body 122.

Details of other features of construction and operation of the transport assembly 152 are the same as those set forth above for the transport assembly 120 (FIGS. 4A-4E) and need not be repeated for an understanding.

Illustrative Methods

Illustrative methods associated with embodiments of the nuclear fission igniter 110 will now be described.

Figure 6A:
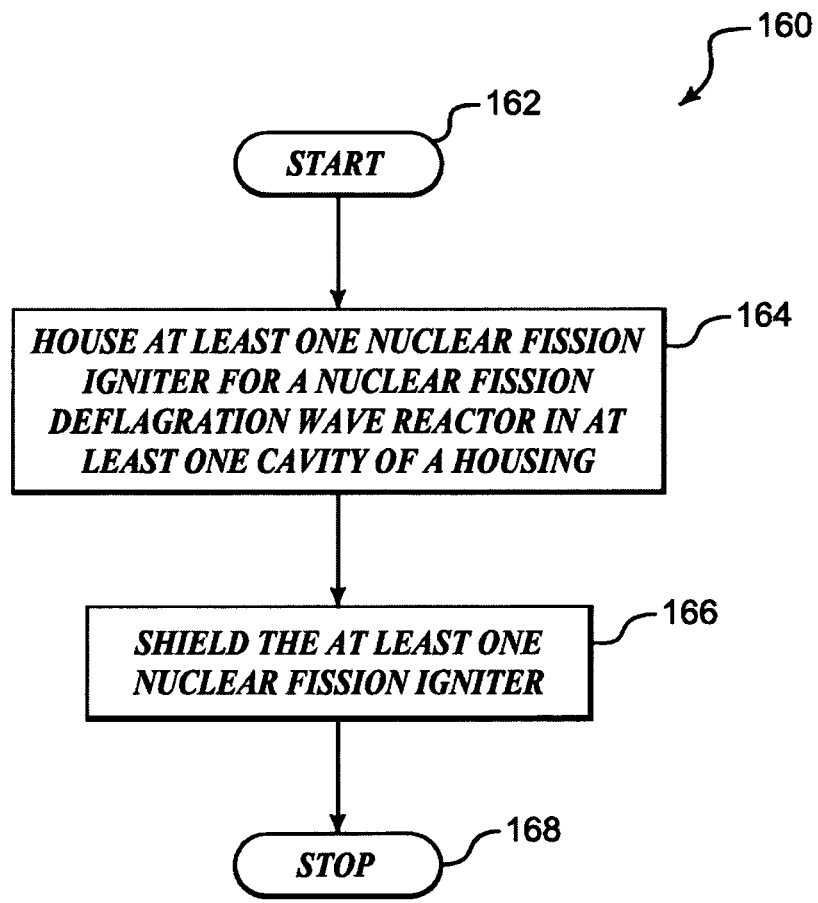
FIGS. 6A-6C are flowcharts of illustrative methods of housing a nuclear fission igniter.
Figure 6B:
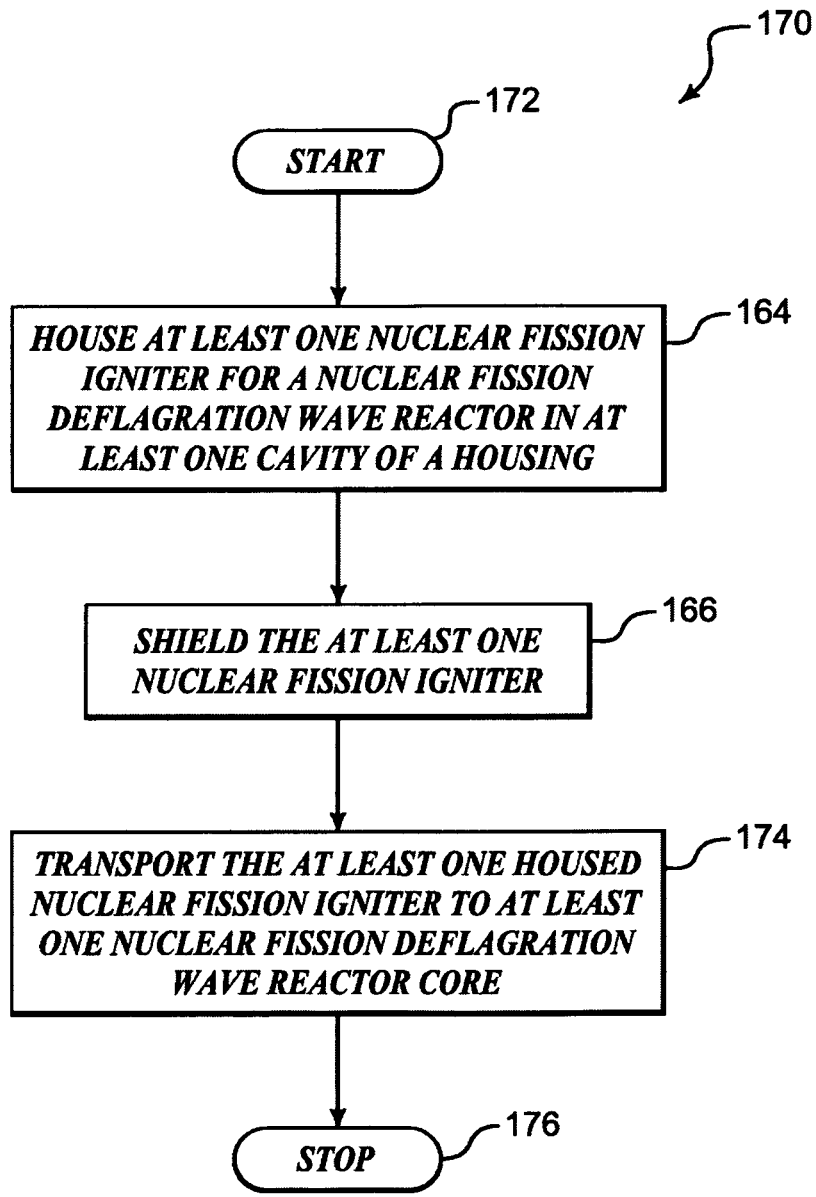
Figure 6C:
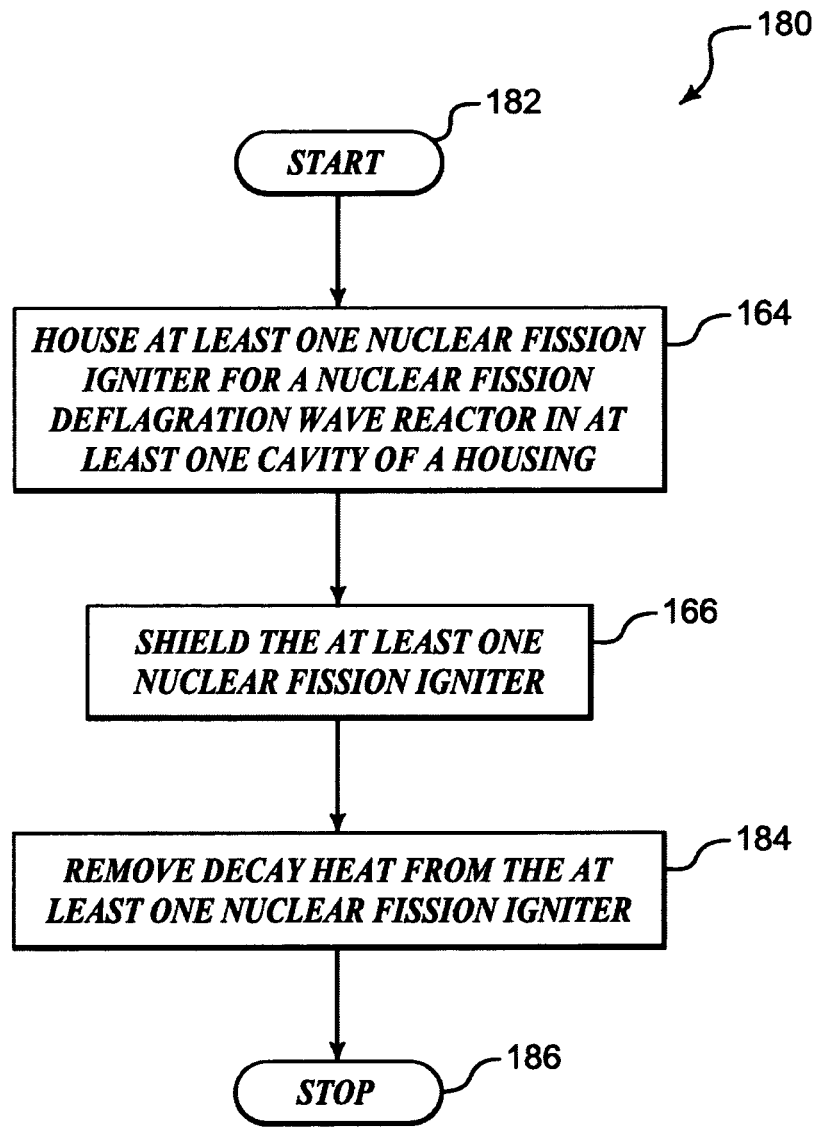

Referring to FIGS. 6A-6C, illustrative methods are provided for housing a nuclear fission igniter.

Referring now to FIG. 6A, an illustrative method 160 for housing a nuclear fission igniter starts at a block 162. At a block 164, at least one nuclear fission igniter for a nuclear fission deflagration wave reactor is housed in at least one cavity of a housing. The nuclear fission igniter suitably may be one or more of the nuclear fission igniters 110 described above. That is, the nuclear fission igniter includes a portion of nuclear fission fuel material insertable in a nuclear fission deflagration wave reactor, wherein the portion of nuclear fuel material has a $k_{effective}$ less than 1 when the nuclear fission igniter is outside a nuclear fission deflagration wave reactor and the portion of nuclear fuel material is arranged to establish a $k_{effective}$ of at least 1 when the nuclear fission igniter is installed in a nuclear fission deflagration wave reactor. The cavity may be one or more of the cavities 26 defined in the housing body 122 of the transport assembly 120, as described above.

At a block 166 the at least one nuclear fission igniter is shielded. The nuclear fission igniter may be shielded in any manner as desired. For example, shielding may be applied to an exterior of the nuclear fission igniter. As another example, the housing may already be shielded and thus housing the nuclear fission igniter also results in shielding the nuclear fission igniter. As a further example, shielding may be applied to the housing after the nuclear fission igniter has been housed in the housing. In some embodiments, the shielding may shield against neutrons. In other embodiments, the shielding may shield against radiation, such as $\alpha$, $\beta$, and/or $\gamma$ radiation. The method 160 stops at a block 168.

Referring now to FIG. 6B, an illustrative method 170 for housing a nuclear fission igniter starts at a block 172. The method 170 includes the block 164, at which at least one nuclear fission igniter for a nuclear fission deflagration wave reactor is housed in at least one cavity of a housing. The method 170 also includes the block 166 at which the at least one nuclear fission igniter is shielded.

At a block 174 the at least one housed nuclear fission igniter is transported to at least one nuclear fission deflagration wave reactor core. In some embodiments, one or more nuclear fission igniters may be transported to one nuclear fission deflagration wave reactor core. In some other embodiments, one or more nuclear fission igniters may be transported to more than one nuclear fission deflagration wave reactor cores. In one of these other embodiments, one nuclear fission igniter may be transported to more than one nuclear fission deflagration wave reactor cores. In such a case, the one nuclear fission igniter may be transported to one nuclear fission deflagration wave reactor core and used to initiate a nuclear fission deflagration wave, removed from the started-up nuclear fission deflagration wave reactor core, and transported to another nuclear fission deflagration wave reactor core where the nuclear fission igniter can be used to initiate a nuclear fission deflagration wave, and so on as desired. In such a case, decay heat may be removed from the nuclear fission igniter (as discussed above) during transport after the nuclear fission igniter has been used to initiate a nuclear fission deflagration wave. The method 170 stops at a block 176.

Referring now to FIG. 6C, an illustrative method 180 for housing a nuclear fission igniter starts at a block 182. The method 180 includes the block 164, at which at least one nuclear fission igniter for a nuclear fission deflagration wave reactor is housed in at least one cavity of a housing. The method 180 also includes the block 166 at which the at least one nuclear fission igniter is shielded.

At a block 184 decay heat is removed from the nuclear fission igniter. For example, decay heat may be removed from a nuclear fission igniter (as discussed above) during transport after the nuclear fission igniter has been used to initiate a nuclear fission deflagration wave, as discussed above. As another example, decay heat may be removed from a nuclear fission igniter that has not yet been used to initiate a nuclear fission deflagration wave but that includes nuclear fission fuel material that includes at least some components that have previously undergone neutron-mediated nuclear fission (also referred to herein as having been previously "burnt"). The method 180 stops at a block 186.

Referring now to FIGS. 7A-7D, illustrative methods are provided for placing a nuclear fission igniter in a nuclear fission deflagration wave reactor.

Figure 7A:
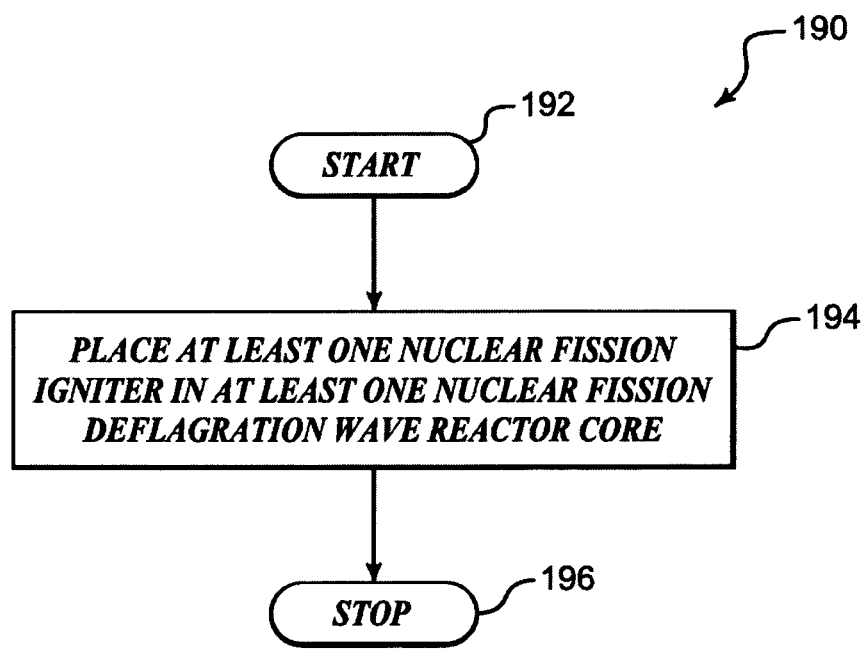
FIGS. 7A-7D are flowcharts of illustrative methods of placing a nuclear fission igniter in a nuclear fission deflagration wave reactor core.

Referring now to FIG. 7A, an illustrative method 190 starts at a block 192. At a block 194, at least one nuclear fission igniter is placed in at least one nuclear fission deflagration wave reactor core. The nuclear fission igniter suitably may be one or more of the nuclear fission igniters 110 described above. That is, the nuclear fission igniter includes a portion of nuclear fission fuel material insertable in a nuclear fission deflagration wave reactor, wherein the portion of nuclear fuel material has a $k_{effective}$ less than 1 when the nuclear fission igniter is outside a nuclear fission deflagration wave reactor and the portion of nuclear fuel material is arranged to establish a $k_{effective}$ of at least 1 when the nuclear fission igniter is installed in a nuclear fission deflagration wave reactor.

In some embodiments, one nuclear fission igniter is placed in one nuclear fission deflagration wave reactor core. In some other embodiments, more than one nuclear fission igniter is placed in one nuclear fission deflagration wave reactor core. In further embodiments, more than one nuclear fission igniters are placed in more than one nuclear fission deflagration wave reactor cores.

In some embodiments and as described above, channels defined on an outer surface of the portion of nuclear fission fuel material are mated with coolant channels defined in the nuclear fission deflagration wave reactor core. However, in some other embodiments, one or more transport assemblies that house one or more nuclear fission igniters are placed in a nuclear fission deflagration wave reactor core. The method 190 stops at a block 196.

Figure 7B:
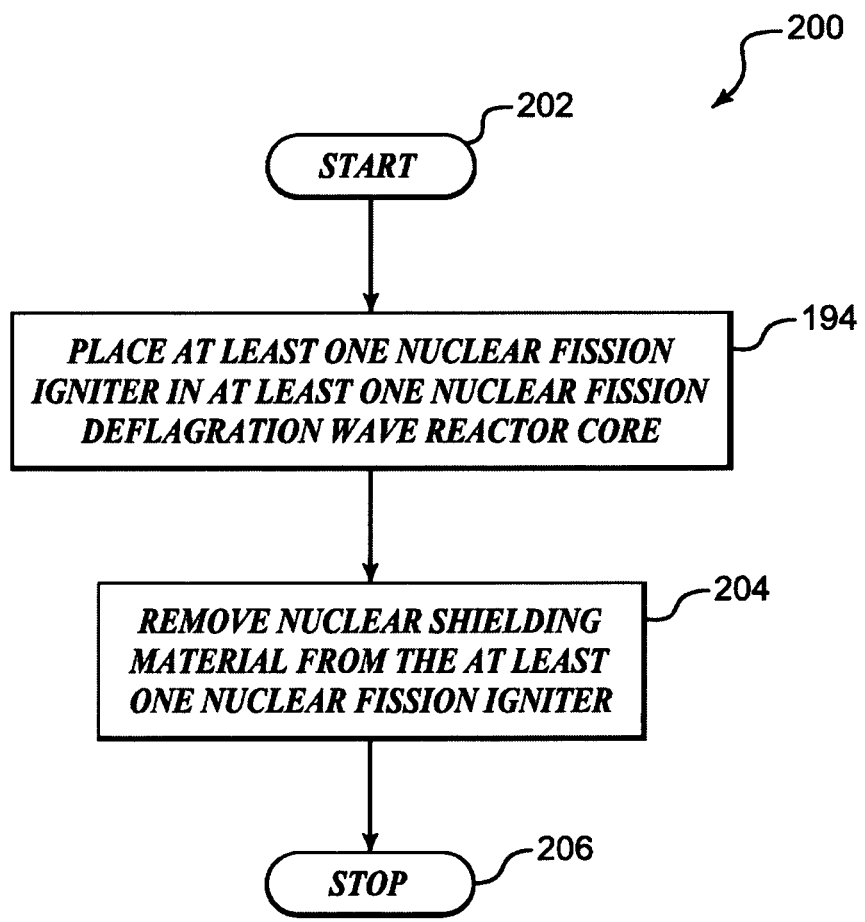

Referring now to FIG. 7B, an illustrative method 200 starts at a block 202. The method 200 includes the block 194, at which at least one nuclear fission igniter is placed in at least one nuclear fission deflagration wave reactor core.

At a block 204 nuclear shielding material is removed from the at least one nuclear fission igniter. As discussed above, in one example the nuclear shielding material may be removed from an interior and/or exterior of the nuclear fission igniter. As another example, a housing (such as a transport assembly) may have been shielded and thus removing the nuclear fission igniter from the housing also results in removing the nuclear shielding material from the nuclear fission igniter. As discussed above, in some embodiments, the nuclear shielding material may shield against neutrons and in other embodiments the nuclear shielding shielding may shield against radiation, such as $\alpha$, $\beta$, and/or $\gamma$ radiation. The method 200 stops at a block 206.

Figure 7C:
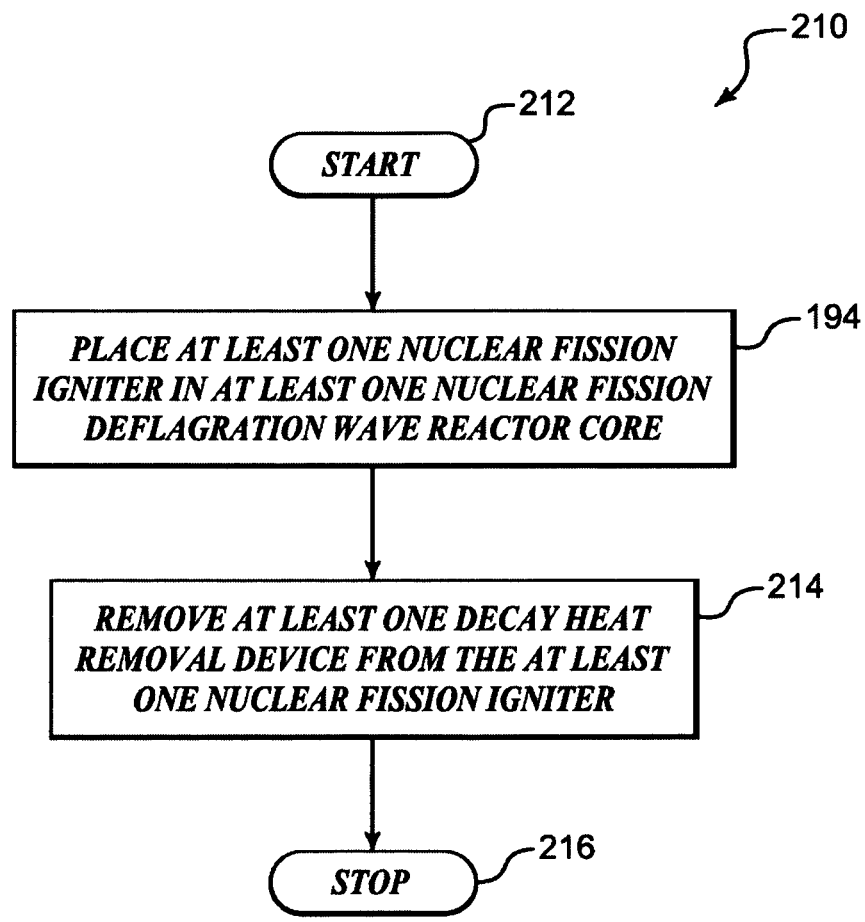

Referring now to FIG. 7C, an illustrative method 210 starts at a block 212. The method 210 includes the block 194, at which at least one nuclear fission igniter is placed in at least one nuclear fission deflagration wave reactor core.

At a block 214 at least one decay heat removal device is removed from the at least one nuclear fission igniter. For example and as described above, the decay heat removal device may be a heat pipe, or a coolant loop, or the like. As discussed above, the decay heat removal device may have been used to remove decay heat from a nuclear fission igniter during transport after the nuclear fission igniter has been used to initiate a nuclear fission deflagration wave. As also discussed above, the decay heat removal device may have been used to remove decay heat from a nuclear fission igniter that has not yet been used to initiate a nuclear fission deflagration wave but that includes nuclear fission fuel material that includes at least some components that have previously undergone neutron-mediated nuclear fission (also referred to herein as having been previously "burnt"). The method 210 stops at a block 216.

Figure 7D:
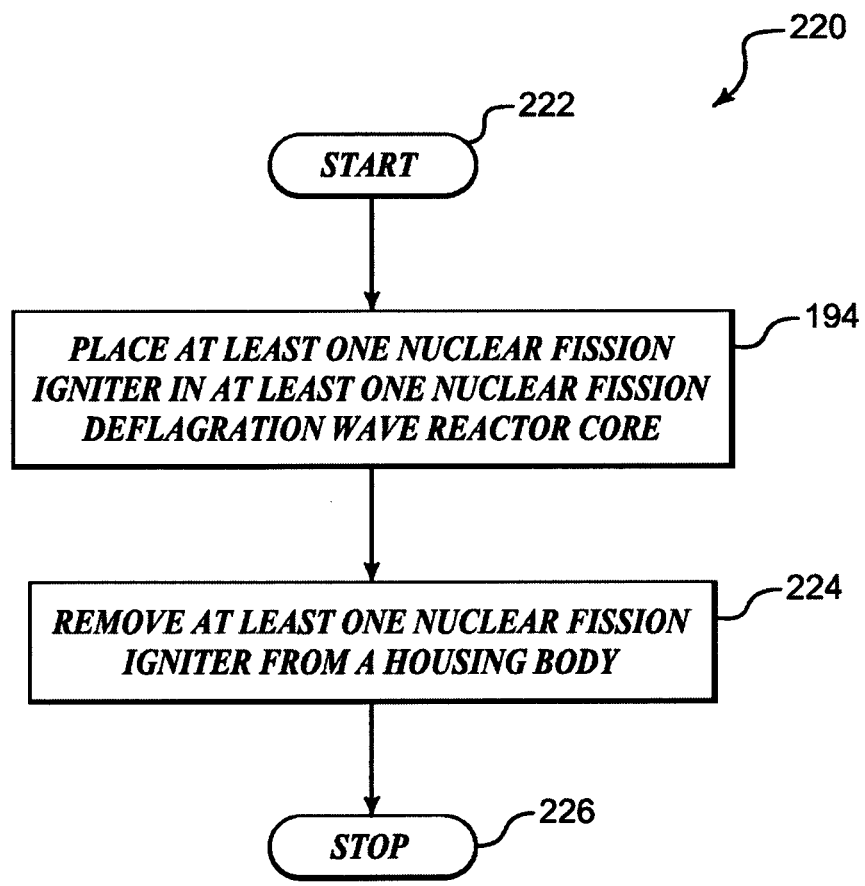

Referring now to FIG. 7D, an illustrative method 220 starts at a block 222. The method 220 includes the block 194, at which at least one nuclear fission igniter is placed in at least one nuclear fission deflagration wave reactor core.

At a block 224 the at least one nuclear fission igniter is removed from a housing body, such as a transport assembly as described above. The method 220 stops at a block 226.

Figure 8A:
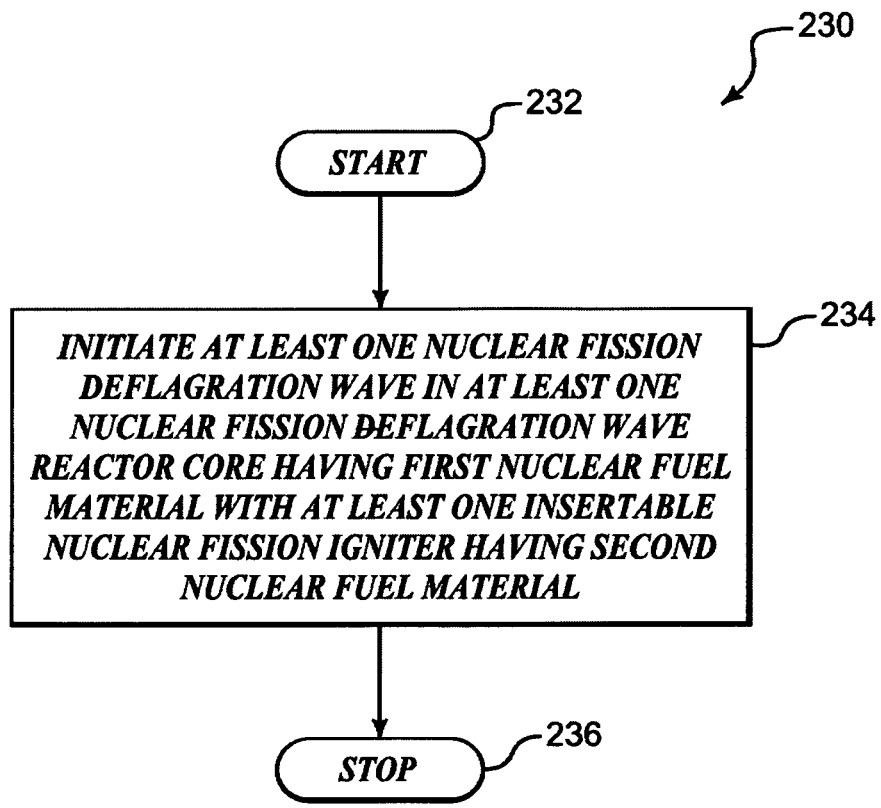
FIGS. 8A and 8B are flowcharts of illustrative methods of initiating at least one nuclear fission deflagration wave.
Figure 8B:
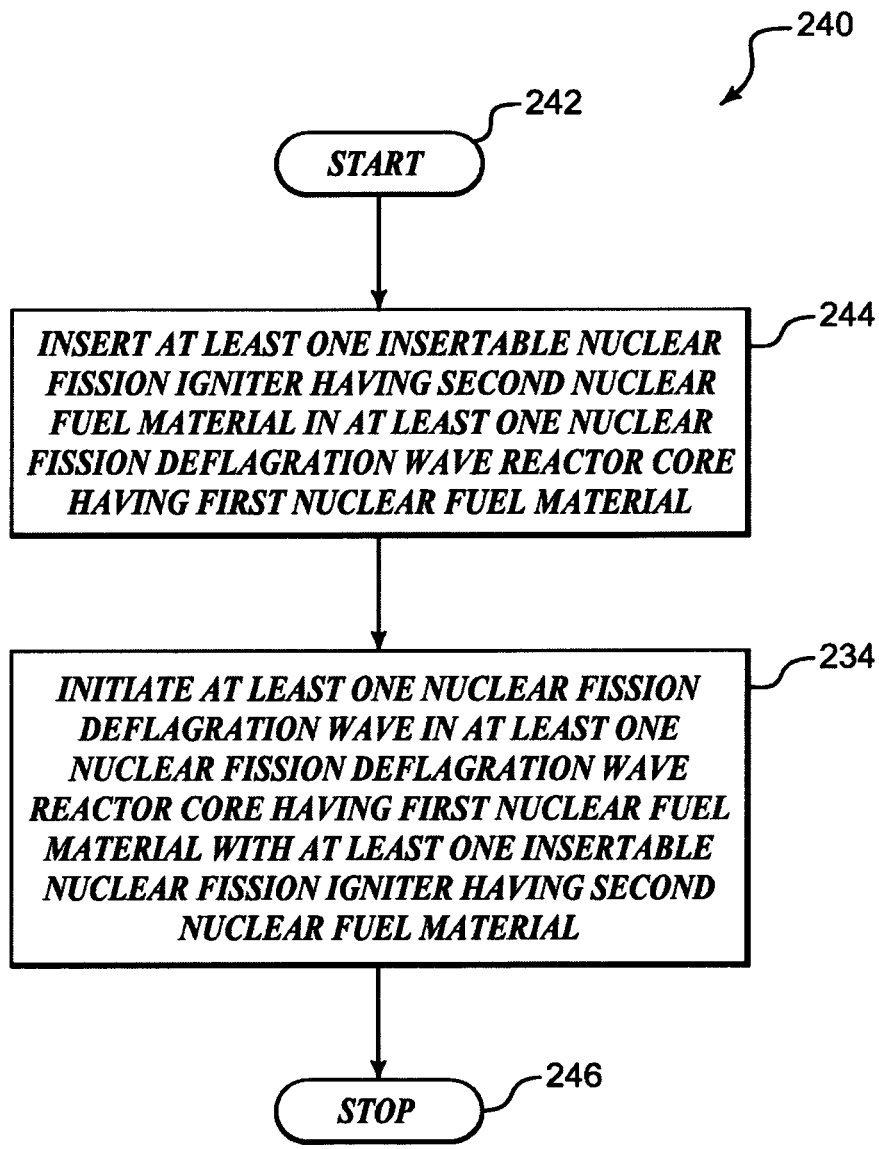

Referring now to FIGS. 8A-8B, illustrative methods are provided for initiating at least one nuclear fission deflagration wave.

Referring now to FIG. 8A, an illustrative method 230 starts at a block 232. At a block 234 at least one nuclear fission deflagration wave is initiated in at least one nuclear fission reactor core having first nuclear fuel material with at least one insertable nuclear fission igniter having second nuclear fuel material.

Initiation of the nuclear fission deflagration wave can be accomplished in part by action of any one of or a combination of modalities as described above, as desired. In some embodiments the at least one nuclear fission deflagration wave can be initiated in part by removing neutron absorbing material from the first nuclear fission fuel material and/or the second nuclear fission fuel material. In some other embodiments the at least one nuclear fission deflagration wave can be initiated in part by adding neutron moderating material to the first nuclear fission fuel material and/or the second nuclear fission fuel material. In some other embodiments the at least one nuclear fission deflagration wave can be initiated in part by adding neutron reflecting material to the first nuclear fission fuel material and/or the second nuclear fission fuel material. In some other embodiments the at least one nuclear fission deflagration wave can be initiated in part by adding neutron multiplicative material to the first nuclear fission fuel material and/or the second nuclear fission fuel material. In some embodiments, initiating the nuclear fission deflagration wave entails providing neutrons from the nuclear fission igniter to fertile material in the first nuclear fission fuel material. The method 230 stops at a block 236.

Referring now to FIG. 8B, an illustrative method 240 starts at a block 242. At a block 244 at least one nuclear fission igniter is inserted in the at least one nuclear fission deflagration wave reactor core.

The method 240 includes the block 234, at which at least one nuclear fission deflagration wave is initiated in at least one nuclear fission reactor core having first nuclear fuel material with at least one insertable nuclear fission igniter having second nuclear fuel material.

In some embodiments, more than one nuclear fission igniters are inserted in one nuclear fission deflagration wave reactor core. In these embodiments, more than one nuclear fission deflagration waves can be initiated in the one nuclear fission deflagration wave reactor core. In some other embodiments, at least one nuclear fission igniter is inserted in each of more than one nuclear fission deflagration wave reactor cores. In these other embodiments, at least one nuclear fission deflagration wave can be initiated in each of the nuclear fission deflagration wave reactor cores. The method 240 stops at a block 246.

Referring now to FIGS. 6A-6C, 7A-7D, and 8A-8B, the processing blocks may be performed in any temporal order as desired. No limitation whatsoever is intended regarding temporal ordering of the processing blocks. To that end, processing blocks may be performed in any serial ordering (that is, one after another) as desired and processing blocks also may be performed in parallel (that is, simultaneously) as desired.

Processes performed at the processing blocks may be performed by an operator when conditions permit, such as operations performed outside a reactor compartment or inside a reactor compartment after reactor shutdown with the reactor cooled down and depressurized. Alternately, processes performed at the processing blocks may be performed by a machine or a robot controlled remotely by an operator during any reactor condition and in any location. Likewise, processes performed at the processing blocks may be performed autonomously by a machine or a robot during any reactor condition and in any location.

While a number of illustrative embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A nuclear fission deflagration wave reactor core comprising:
   first nuclear fission fuel material configured to propagate a nuclear fission deflagration wave therein; and
   at least one removably replaceable nuclear fission igniter removably received in the first nuclear fission fuel material, the at least one removably replaceable nuclear fission igniter including a portion of second nuclear fission fuel material, wherein the at least one removably replaceable nuclear fission igniter is arranged to establish a $k_{effective}$ of at least 1.

2. The nuclear fission deflagration wave nuclear fission reactor core of claim 1, further comprising a plurality of coolant channels.

3. The nuclear fission deflagration wave nuclear fission reactor core of claim 2, wherein the at least one nuclear fission igniter defines a plurality of channels on an outer surface that mate with the plurality of coolant channels.

4. The nuclear fission deflagration wave nuclear fission reactor core of claim 1, wherein the first nuclear fuel material includes fertile material.

5. The nuclear fission deflagration wave nuclear fission reactor core of claim 4, wherein the fertile material includes fertile material chosen from $^{238}U$ and $^{232}Th$.

6. The nuclear fission deflagration wave nuclear fission reactor core of claim 4, wherein the first nuclear fuel material further includes fissile material.

7. The nuclear fission deflagration wave nuclear fission reactor core of claim 6, wherein the fissile material includes fissile material chosen from $^{233}U$, $^{235}U$, and $^{239}Pu$.

8. The nuclear fission deflagration wave nuclear fission reactor core of claim 1, wherein the second nuclear fuel material includes fissile material.

9. The nuclear fission deflagration wave nuclear fission reactor core of claim 8, wherein the fissile material includes fissile material chosen from $^{233}U$, $^{235}U$, and $^{239}Pu$.

10. The nuclear fission deflagration wave nuclear fission reactor core of claim 8, wherein the second nuclear fuel material further includes fertile material.

11. The nuclear fission deflagration wave nuclear fission reactor core of claim 10, wherein the fertile material includes fertile material chosen from $^{238}U$ and $^{232}Th$.

12. The nuclear fission deflagration wave nuclear fission reactor core of claim 1, wherein:

the first nuclear fission fuel material has a first concentration of fissile material; and the second nuclear fission fuel material has a second concentration of fissile material that is greater than the first concentration of fissile material.

13. The nuclear fission deflagration wave nuclear fission reactor core of claim 1, wherein concentration of the first nuclear fission fuel material varies spatially.

14. The nuclear fission deflagration wave nuclear fission reactor core of claim 1, wherein concentration of the second nuclear fission fuel material varies spatially.

15. The nuclear fission deflagration wave nuclear fission reactor core of claim 1, wherein the at least one nuclear fission igniter has at least one dimension of not substantially less than one mean free path for fission-inducing neutrons.

16. The nuclear fission deflagration wave nuclear fission reactor core of claim 1, wherein the at least one nuclear fission igniter has at least one dimension of less than one mean free path for fission-inducing neutrons.

17. The nuclear fission deflagration wave nuclear fission reactor core of claim 1, wherein the at least one nuclear fission igniter is configured for removal of neutron absorbing material therefrom.

18. The nuclear fission deflagration wave nuclear fission reactor core of claim 17, wherein the neutron absorbing material includes a neutron absorber chosen from $^{10}B$ and $^{6}Li$.

19. The nuclear fission deflagration wave nuclear fission reactor core of claim 17, wherein the neutron absorbing material is removable from within the portion of second nuclear fission fuel material.

20. The nuclear fission deflagration wave nuclear fission reactor core of claim 17, wherein the neutron absorbing material is removable from an exterior of the portion of second nuclear fission fuel material.

21. The nuclear fission deflagration wave nuclear fission reactor core of claim 1, further comprising neutron moderating material.

22. The nuclear fission deflagration wave nuclear fission reactor core of claim 21, wherein the neutron moderating material includes a neutron moderator chosen from heavy water, carbon, and $^{7}Li$.

23. The nuclear fission deflagration wave nuclear fission reactor core of claim 1, further comprising neutron reflecting material.

24. The nuclear fission deflagration wave nuclear fission reactor core of claim 23, wherein the neutron reflecting material includes a neutron reflector chosen from graphite and beryllium.

25. The nuclear fission deflagration wave nuclear fission reactor core of claim 1, further comprising neutron multiplicative material.

26. The nuclear fission deflagration wave nuclear fission reactor core of claim 25, wherein the neutron multiplicative material includes a neutron multiplier chosen from $^{9}Be$ and beryllides.

\* \* \* \* \*